US008538450B2

(12) United States Patent
Zhang et al.

(10) Patent No.: US 8,538,450 B2
(45) Date of Patent: Sep. 17, 2013

(54) USER EQUIPMENT AND BASE STATION BEHAVIOR IN RESPONSE TO AN OVERLOAD INDICATOR

(75) Inventors: Xiaoxia Zhang, San Diego, CA (US); Durga Prasad Malladi, San Diego, CA (US); Tao Luo, San Diego, CA (US)

(73) Assignee: Qualcomm Incorporated, San Diego, CA (US)

( * ) Notice: Subject to any disclaimer, the term of this patent is extended or adjusted under 35 U.S.C. 154(b) by 360 days.

(21) Appl. No.: 12/834,604

(22) Filed: Jul. 12, 2010

(65) Prior Publication Data

US 2011/0014940 A1     Jan. 20, 2011

Related U.S. Application Data

(60) Provisional application No. 61/226,050, filed on Jul. 16, 2009.

(51) Int. Cl.
*H04W 72/00*       (2009.01)

(52) U.S. Cl.
USPC .......................................... 455/453; 455/522

(58) Field of Classification Search
USPC ................... 455/69, 522, 443, 453
See application file for complete search history.

(56) References Cited

U.S. PATENT DOCUMENTS

2008/0081564 A1*   4/2008   Rao ............................... 455/63.1

FOREIGN PATENT DOCUMENTS

| WO | WO2008055132 A2 | 5/2008 |
| WO | WO2009055619 | 4/2009 |

OTHER PUBLICATIONS

International Search Report and Written Opinion—PCT/US2010/042001, International Search Authority—European Patent Office—Nov. 10, 2010.
Ericsson: "On the need o f uplink power control overload indicator in urban canyon environment" 3GPP Draft; R1-071595, 3rd Generation Partnership Project (3GPP), Mobile Competence Centre ; 650, Route Des Lucioles ; F-06921 Sophia-Antipolis Cedex ; France, vol. RAN WG1, no. St. Julian; Apr. 3, 2007, XP050105525.
Lei Cao, et al., "Uplink Power Control for an SC-FDMA Mobi 1 e Cellular System" Vehicular Technology Conference, 2008. VTC 2008-Fall. I E E E 68th, I E E E , Piscataway, NJ, USA, Sep. 21, 2008, pp. 1-5, XP031352572 ISBN: 978-1-4244-1721-6.
Ericsson, "Inter-cell Interference Coordination for E-UTRA-Overload Indicator for Uplink Power Control" 3GPP, R1-073038, Jun. 29, 2007.
Taiwan Search Report—TW099123532—TIPO—May 14, 2013.

* cited by examiner

*Primary Examiner* — Tu X Nguyen
(74) *Attorney, Agent, or Firm* — Larry J. Moskowitz

(57) ABSTRACT

Systems and methodologies are described that facilitate responding to overload indicators in a wireless communication environment. A non-serving base station can send an over-the-air (OTA) overload indicator (OI) and a backhaul OI. A UE can receive the OTA OI from the non-serving base station, generate a report based upon the OTA OI, and send the report to a serving base station. The serving base station can receive the report from the UE, and generate a power control command for the UE based at least in part upon the report. Moreover, the serving base station can generate the power control command for the UE further based upon the backhaul OI received from the non-serving base station. For example, the UE can be configured to ignore the OTA OI. By way of another example, the serving base station can cause the non-serving base station to inhibit sending the backhaul OI.

22 Claims, 11 Drawing Sheets

USER EQUIPMENT AND BASE STATION BEHAVIOR IN RESPONSE TO AN OVERLOAD INDICATOR

CROSS-REFERENCE TO RELATED APPLICATIONS

This application claims the benefit of U.S. Provisional Patent Application Ser. No. 61/226,050 entitled "MOBILE DEVICE AND EVOLVED NODE-B BEHAVIOR IN RESPONSE TO OVERLOAD INDICATORS" which was filed Jul. 16, 2009. The entirety of the aforementioned application is herein incorporated by reference.

BACKGROUND

I. Field

The following description relates generally to wireless communications, and more particularly to responses to an overload indicator in a wireless communication system.

II. Background

Wireless communication systems are widely deployed to provide various types of communication content such as, for example, voice, data, and so on. Typical wireless communication systems can be multiple-access systems capable of supporting communication with multiple users by sharing available system resources (e.g., bandwidth, transmit power). Examples of such multiple-access systems can include Code Division Multiple Access (CDMA) systems, Time Division Multiple Access (TDMA) systems, Frequency Division Multiple Access (FDMA) systems, Orthogonal Frequency Division Multiple Access (OFDMA) systems, and the like. Additionally, the systems can conform to specifications such as third generation partnership project (3GPP), 3GPP long term evolution (LTE), ultra mobile broadband (UMB), multi-carrier wireless specifications such as evolution data optimized (EV-DO), one or more revisions thereof, etc.

Generally, wireless multiple-access communication systems can simultaneously support communication for multiple user equipments (UEs). Each UE can communicate with one or more base stations via transmissions on forward and reverse links. The forward link (or downlink) refers to the communication link from base stations to UEs, and the reverse link (or uplink) refers to the communication link from UEs to base stations. Further, communications between UEs and base stations can be established via single-input single-output (SISO) systems, multiple-input single-output (MISO), multiple-input multiple-output (MIMO) systems, and so forth. In addition, UEs can communicate with other UEs (and/or base stations with other base stations) in peer-to-peer wireless network configurations.

Heterogeneous wireless communication systems commonly can include various types of base stations, each of which can be associated with differing cell sizes. For instance, macro cell base stations typically leverage antenna(s) installed on masts, rooftops, other existing structures, or the like. Further, macro cell base stations oftentimes have power outputs on the order of tens of watts, and can provide coverage for large areas. The femto cell base station is another class of base station that has recently emerged. Femto cell base stations are commonly designed for residential or small business environments, and can provide wireless coverage to UEs using a wireless technology (e.g., 3GPP Universal Mobile Telecommunications System (UMTS) or LTE, 1x Evolution-Data Optimized (1xEV-DO)) to communicate with the UEs and an existing broadband Internet connection (e.g., digital subscriber line (DSL), cable) for backhaul. A femto cell base station can also be referred to as a Home Evolved Node B (HeNB), a Home Node B (HNB), a femto cell, an access point base station, or the like. Examples of other types of base stations include pico cell base stations, micro cell base stations, and so forth.

To maintain uplink performance in a wireless communication system, interference caused by UE(s) in neighboring cell(s) (e.g., UE(s) served by respective serving base station(s)) can be monitored. For instance, interference over thermal (IoT) can be measured by a non-serving base station. Moreover, tight IoT control can be achieved by the non-serving base station using an overload indicator. According to an example, the non-serving base station can measure an interference level caused by an uplink transmission sent by a UE in a neighboring cell (e.g., served by a serving base station). Following this example, if the interference level exceeds a threshold, the non-serving base station can generate an overload indicator that signifies that the non-serving base station is overloaded on the uplink.

Conventionally, the overload indicator is sent between base stations over a backhaul via an X2 interface. Pursuant to the above example, the non-serving base station that generates the overload indicator based upon interference caused by the UE served by the serving base station can send the overload indicator over the backhaul to the serving base station. Further, the serving base station can control a transmit power level of the UE served thereby using a power control command generated based upon the overload indicator received over the backhaul. In common approaches, the response to the overload indicator received by the serving base station over the backhaul can be dependent upon base station implementation.

However, in a heterogeneous wireless communication system, a backhaul can be lacking. For example, the X2 interface may not be available between a femto cell base station and a macro cell base station. To address the foregoing, over-the-air transmission of an overload indicator can be leveraged. Thus, the non-serving base station that generates the overload indicator can transmit the overload indicator over-the-air to the serving base station. Further, the serving base station (e.g., femto cell base station) can have receiver capability similar to a UE. Moreover, if the overload indicator is sent over-the-air, the UE can also receive the overload indicator in addition to reception by the serving base station. However, conventional approaches typically fail to reconcile responses to the power control command received by the UE from the serving base station and the overload indicator received over-the-air from the non-serving base station.

SUMMARY

In accordance with one or more embodiments and corresponding disclosure thereof, various aspects are described in connection with facilitating responding to overload indicators in a wireless communication environment. A non-serving base station can send an over-the-air (OTA) overload indicator (OI) and a backhaul OI. A UE can receive the OTA OI from the non-serving base station, generate a report based upon the OTA OI, and send the report to a serving base station. The serving base station can receive the report from the UE, and generate a power control command for the UE based at least in part upon the report. Moreover, the serving base station can generate the power control command for the UE further based upon the backhaul OI received from the non-serving base station. For example, the UE can be configured to ignore the OTA OI. By way of another example, the serving base station can cause the non-serving base station to inhibit sending the backhaul OI.

According to related aspects, a method that facilitates responding to overload indicators in a wireless communication environment is described herein. The method can include receiving an over-the-air overload indicator from a non-serving base station at a user equipment (UE). Further, the method can include generating a report based upon the over-the-air overload indicator. Moreover, the method can include sending the report to a serving base station from the UE.

Another aspect relates to a wireless communications apparatus. The wireless communications apparatus can include a memory that retains instructions related to receiving an over-the-air overload indicator from a non-serving base station at a user equipment (UE), generating a report based upon the over-the-air overload indicator, and sending the report to a serving base station from the UE. Further, the wireless communications apparatus can include a processor, coupled to the memory, configured to execute the instructions retained in the memory.

Yet another aspect relates to a wireless communications apparatus that enables utilizing overload indicators in a wireless communication environment. The wireless communications apparatus can include means for receiving an over-the-air overload indicator from a non-serving base station at a user equipment (UE). Moreover, the wireless communications apparatus can include means for generating a report based upon the over-the-air overload indicator. Further, the wireless communications apparatus can include means for sending the report to a serving base station from the UE.

Still another aspect relates to a computer program product that can comprise a computer-readable medium. The computer-readable medium can include code for receiving an over-the-air overload indicator from a non-serving base station at a user equipment (UE). Moreover, the computer-readable medium can include code for generating a report based upon the over-the-air overload indicator. The computer-readable medium can further include code for sending the report to a serving base station from the UE.

In accordance with another aspect, a wireless communications apparatus can include a processor, wherein the processor can be configured to receive an over-the-air overload indicator from a non-serving base station at a user equipment (UE). Further, the processor can be configured to generate a report based upon the over-the-air overload indicator. Moreover, the processor can be configured to send the report to a serving base station from the UE.

According to other aspects, a method that facilitates responding to overload indicators in a wireless communication environment is described herein. The method can include receiving a report from a user equipment (UE) generated based upon an over-the-air overload indicator received by the UE from a non-serving base station. Moreover, the method can include generating a power control command for the UE based at least in part upon the report received from the UE.

Another aspect relates to a wireless communications apparatus. The wireless communications apparatus can include a memory that retains instructions related to receiving a report from a user equipment (UE) generated based upon an over-the-air overload indicator received by the UE from a non-serving base station, and generating a power control command for the UE based at least in part upon the report received from the UE. Further, the wireless communications apparatus can include a processor, coupled to the memory, configured to execute the instructions retained in the memory.

Yet another aspect relates to a wireless communications apparatus that enables employing overload indicators in a wireless communication environment. The wireless communications apparatus can include means for receiving a report from a user equipment (UE) generated based upon an over-the-air overload indicator received by the UE from a non-serving base station. Further, the wireless communications apparatus can include means for generating a power control command for the UE based at least in part upon the report received from the UE.

Still another aspect relates to a computer program product that can comprise a computer-readable medium. The computer-readable medium can include code for receiving a report from a user equipment (UE) generated based upon an over-the-air overload indicator received by the UE from a non-serving base station. Moreover, the computer-readable medium can include code for generating a power control command for the UE based at least in part upon the report received from the UE.

In accordance with another aspect, a wireless communications apparatus can include a processor, wherein the processor can be configured to receive a report from a user equipment (UE) generated based upon an over-the-air overload indicator received by the UE from a non-serving base station. Further, the processor can be configured to generate a power control command for the UE based at least in part upon the report received from the UE. Moreover, the processor can be configured to transmit the power control command to the UE over a downlink.

Toward the accomplishment of the foregoing and related ends, the one or more embodiments comprise the features hereinafter fully described and particularly pointed out in the claims. The following description and the annexed drawings set forth herein detail certain illustrative aspects of the one or more embodiments. These aspects are indicative, however, of but a few of the various ways in which the principles of various embodiments can be employed and the described embodiments are intended to include all such aspects and their equivalents.

DETAILED DESCRIPTION

Figure 1:
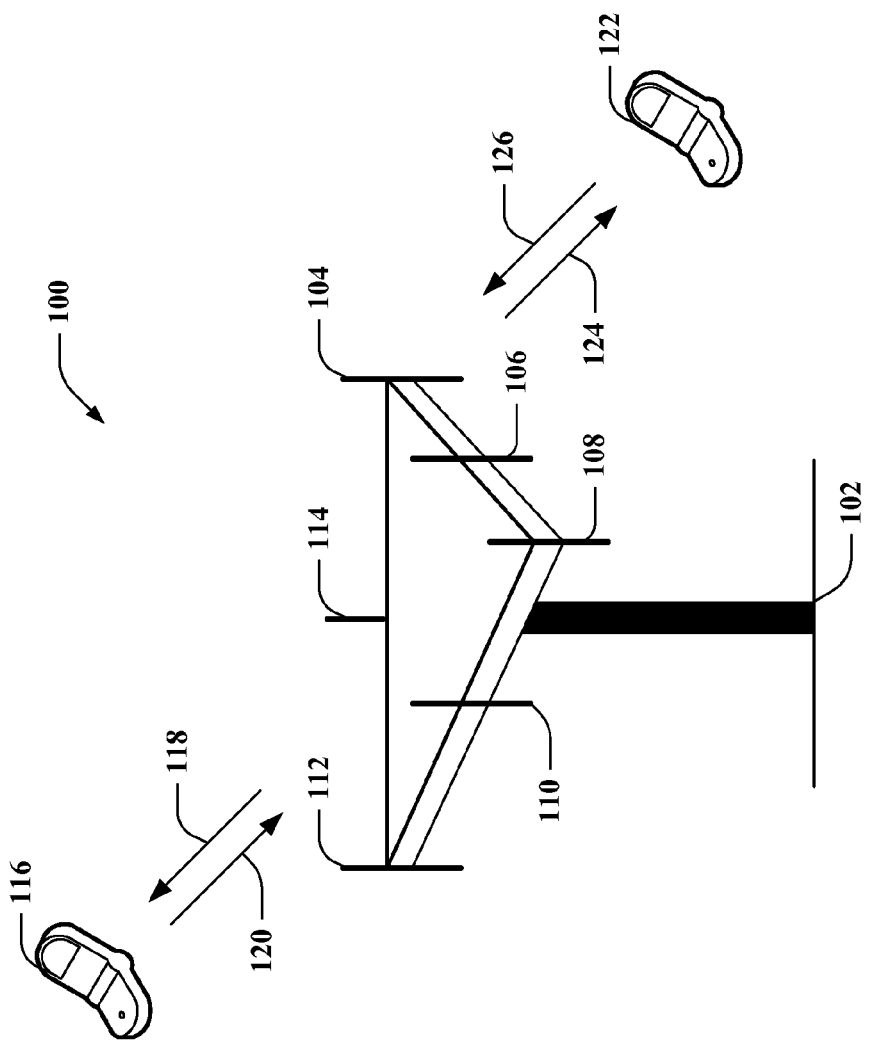
FIG. 1 is an illustration of a wireless communication system in accordance with various aspects set forth herein.

Various aspects of the claimed subject matter are now described with reference to the drawings, wherein like reference numerals are used to refer to like elements throughout. In the following description, for purposes of explanation, numerous specific details are set forth in order to provide a thorough understanding of one or more aspects. It may be evident, however, that such aspects(s) may be practiced without these specific details. In other instances, well-known structures and devices are shown in block diagram form in order to facilitate describing one or more aspects.

As used in this application, the terms "component," "module," "system," and the like are intended to refer to a computer-related entity, either hardware, firmware, a combination of hardware and software, software, or software in execution. For example, a component can be, but is not limited to being, a process running on a processor, a processor, an integrated circuit, an object, an executable, a thread of execution, a program, and/or a computer. By way of illustration, both an application running on a computing device and the computing device can be a component. One or more components can reside within a process and/or thread of execution and a component can be localized on one computer and/or distributed between two or more computers. In addition, these components can execute from various computer readable media having various data structures stored thereon. The components can communicate by way of local and/or remote processes such as in accordance with a signal having one or more data packets (e.g., data from one component interacting with another component in a local system, distributed system, and/or across a network such as the Internet with other systems by way of the signal).

Various techniques described herein can be used for various wireless communication systems, such as Code Division Multiple Access (CDMA) systems, Time Division Multiple Access (TDMA) systems, Frequency Division Multiple Access (FDMA) systems, Orthogonal Frequency Division Multiple Access (OFDMA) systems, Single Carrier-Frequency Division Multiple Access (SC-FDMA) systems, and other such systems. The terms "system" and "network" are often used interchangeably. A CDMA system can implement a radio technology such as Universal Terrestrial Radio Access (UTRA), CDMA2000, etc. UTRA includes Wideband-CDMA (W-CDMA) and other variants of CDMA. CDMA2000 covers IS-2000, IS-95, and IS-856 standards. A TDMA system can implement a radio technology such as Global System for Mobile Communications (GSM). An OFDMA system can implement a radio technology such as Evolved UTRA (E-UTRA), Ultra Mobile Broadband (UMB), IEEE 802.11 (Wi-Fi), IEEE 802.16 (WiMAX), IEEE 802.20, Flash-OFDM, etc. UTRA and E-UTRA are part of Universal Mobile Telecommunication System (UMTS). 3GPP Long Term Evolution (LTE) is a release of UMTS, e.g., Release 8, that uses E-UTRA, which employs OFDMA on the downlink and SC-FDMA on the uplink. UTRA, E-UTRA, UMTS, LTE and GSM are described in documents from an organization named "3rd Generation Partnership Project" (3GPP). Additionally, CDMA2000 and UMB are described in documents from an organization named "3rd Generation Partnership Project 2" (3GPP2). Further, such wireless communication systems can additionally include peer-to-peer (e.g., mobile-to-mobile) ad hoc network systems often using unpaired unlicensed spectrums, 802.xx wireless LAN, BLUETOOTH and any other short- or long-range, wireless communication techniques.

Single Carrier-Frequency Division Multiple Access (SC-FDMA) utilizes single carrier modulation and frequency domain equalization. SC-FDMA has similar performance and essentially the same overall complexity as those of an OFDMA system. A SC-FDMA signal has lower peak-to-average power ratio (PAPR) because of its inherent single carrier structure. SC-FDMA can be used, for instance, in uplink communications where lower PAPR greatly benefits UEs in terms of transmit power efficiency. Accordingly, SC-FDMA can be implemented as an uplink multiple access scheme in 3GPP Long Term Evolution (LTE) or Evolved UTRA.

Furthermore, various aspects are described herein in connection with a user equipment (UE). A UE can refer to a device providing voice and/or data connectivity. A UE can be connected to a computing device such as a laptop computer or desktop computer, or it can be a self-contained device such as a personal digital assistant (PDA). A UE can also be called a system, subscriber unit, subscriber station, mobile station, mobile, remote station, remote terminal, mobile device, user terminal, terminal, wireless communication device, user agent, user device, or access terminal. A UE can be a cellular telephone, a cordless telephone, a Session Initiation Protocol (SIP) phone, a wireless local loop (WLL) station, a personal digital assistant (PDA), a handheld device having wireless connection capability, computing device, or other processing device connected to a wireless modem. Moreover, various aspects are described herein in connection with a base station. A base station can be utilized for communicating with UE(s) and can also be referred to as an access point, Node B, Evolved Node B (eNodeB, eNB) or some other terminology. A base station can refer to a device in an access network that communicates over the air interface, through one or more sectors, with UEs. The base station can act as a router between the wireless terminal and the rest of the access network, which can include an Internet Protocol (IP) network, by converting received air interface frames to IP packets. The base station can also coordinate management of attributes for the air interface.

Moreover, the term "or" is intended to mean an inclusive "or" rather than an exclusive "or." That is, unless specified otherwise, or clear from the context, the phrase "X employs A or B" is intended to mean any of the natural inclusive permutations. That is, the phrase "X employs A or B" is satisfied by any of the following instances: X employs A; X employs B; or X employs both A and B. In addition, the articles "a" and "an" as used in this application and the appended claims should generally be construed to mean "one or more" unless specified otherwise or clear from the context to be directed to a singular form.

Moreover, various functions described herein can be implemented in hardware, software, firmware, or any combination thereof. If implemented in software, the functions can be stored on or transmitted over as one or more instructions or code on a computer-readable medium. Computer-readable media includes both computer storage media and communication media including any medium that facilitates transfer of a computer program from one place to another. A storage media can be any available media that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, includes compact disc (CD), laser disc, optical disc, digital versatile disc (DVD), floppy disk and blu-ray disc (BD), where disks usually reproduce data magnetically and discs reproduce data optically with lasers. Combinations of the above should also be included within the scope of computer-readable media.

Various aspects will be presented in terms of systems that can include a number of devices, components, modules, and the like. It is to be understood and appreciated that the various systems can include additional devices, components, modules, etc. and/or one or more of the devices, components, modules, etc., discussed in connection with the figures need not be included. A combination of these approaches can also be used.

Referring now to FIG. 1, a system 100 is illustrated in accordance with various aspects presented herein. System 100 comprises a base station 102 that can include multiple antenna groups. For example, one antenna group can include antennas 104 and 106, another group can comprise antennas 108 and 110, and an additional group can include antennas 112 and 114. Two antennas are illustrated for each antenna group; however, more or fewer antennas can be utilized for each group. Base station 102 can additionally include a transmitter chain and a receiver chain, each of which can in turn comprise a plurality of components associated with signal transmission and reception (e.g., processors, modulators, multiplexers, demodulators, demultiplexers, antennas, etc.), as will be appreciated by one skilled in the art.

Base station 102 can communicate with one or more user equipments (UEs) such as UE 116 and UE 122; however, it is to be appreciated that base station 102 can communicate with substantially any number of UEs similar to UE 116 and UE 122. UE 116 and UE 122 can be, for example, cellular phones, smart phones, laptops, handheld communication devices, handheld computing devices, satellite radios, global positioning systems, PDAs, and/or any other suitable device for communicating over system 100. As depicted, UE 116 is in communication with antennas 112 and 114, where antennas 112 and 114 transmit information to UE 116 over a forward link 118 and receive information from UE 116 over a reverse link 120. Moreover, UE 122 is in communication with antennas 104 and 106, where antennas 104 and 106 transmit information to UE 122 over a forward link 124 and receive information from UE 122 over a reverse link 126. In a frequency division duplex (FDD) system, forward link 118 can utilize a different frequency band than that used by reverse link 120, and forward link 124 can employ a different frequency band than that employed by reverse link 126, for example. Further, in a time division duplex (TDD) system, forward link 118 and reverse link 120 can utilize a common frequency band and forward link 124 and reverse link 126 can utilize a common frequency band.

Each group of antennas and/or the area in which they are designated to communicate can be referred to as a sector of base station 102. For example, antenna groups can be designed to communicate to UEs in a sector of the areas covered by base station 102. In communication over forward links 118 and 124, the transmitting antennas of base station 102 can utilize beamforming to improve signal-to-noise ratio of forward links 118 and 124 for UE 116 and UE 122. Also, while base station 102 utilizes beamforming to transmit to UE 116 and UE 122 scattered randomly through an associated coverage, UEs in neighboring cells can be subject to less interference as compared to a base station transmitting through a single antenna to all its UEs.

Over-the-air overload indicators and backhaul overload indicators can be present in system 100. Further, behavior of base station 102, UE 116, UE 122, disparate base station(s) (not shown), and disparate UE(s) (not shown) can support use of over-the-air overload indicators and backhaul overload indicators in system 100. An over-the-air overload indicator can also be referred to as a Layer 1 (L1) overload indicator.

According to an example, base station 102 can measure uplink interference (e.g., caused by uplink transmission(s) by UE(s) served by disparate base station(s), . . . ) plus thermal noise, and can generate an overload indicator based upon such measurement. The overload indicator can be a function of interference from UE(s) from other cells, and can lack information concerning traffic or interference generated by UE(s) in a serving cell (e.g., UE 116 or UE 122 served by base station 102). Base station 102 can send the overload indicator to a disparate base station (not shown) via a backhaul; the overload indicator sent over the backhaul can be referred to as a backhaul overload indicator (backhaul OI). Additionally or alternatively, base station 102 can send the overload indicator over an air interface (e.g., on a downlink to a UE served by the disparate base station, to the disparate base station); the overload indicator sent over the air interface can be referred to as an over-the-air overload indicator (OTA OI).

By way of example, the backhaul overload indicator and/or the over-the-air overload indicator can include one bit that signifies whether base station 102 is overloaded (e.g., the one bit can distinguish between base station 102 being overloaded versus not overloaded). Pursuant to another example, the backhaul overload indicator and/or the over-the-air overload indicator can carry one of three possible values: namely, high interference, medium interference, or low interference. It is to be appreciated, however, that the claimed subject matter is not limited to the foregoing examples.

Conventional approaches typically leverage backhaul overload indicators sent over an X2 interface. Thus, backhaul overload indicators can be employed among base stations (e.g., exchanged between base station 102 and the disparate base station) in system 100 to support legacy UE(s) (e.g., Release 8 UE(s)). Yet, system 100 can be a heterogeneous wireless communication system; thus, various base station(s) (e.g., femto cell base station(s)) in system 100 can lack a backhaul. Accordingly, over-the-air overload indicators can be employed (e.g., base station 102 can send the over-the-air overload indicators over the air interface on the downlink to Release 10 UE(s) served by the disparate base station). It is further contemplated that a Release 10 UE can be compatible with legacy approaches (e.g., Release 8 compatible).

Figure 2:
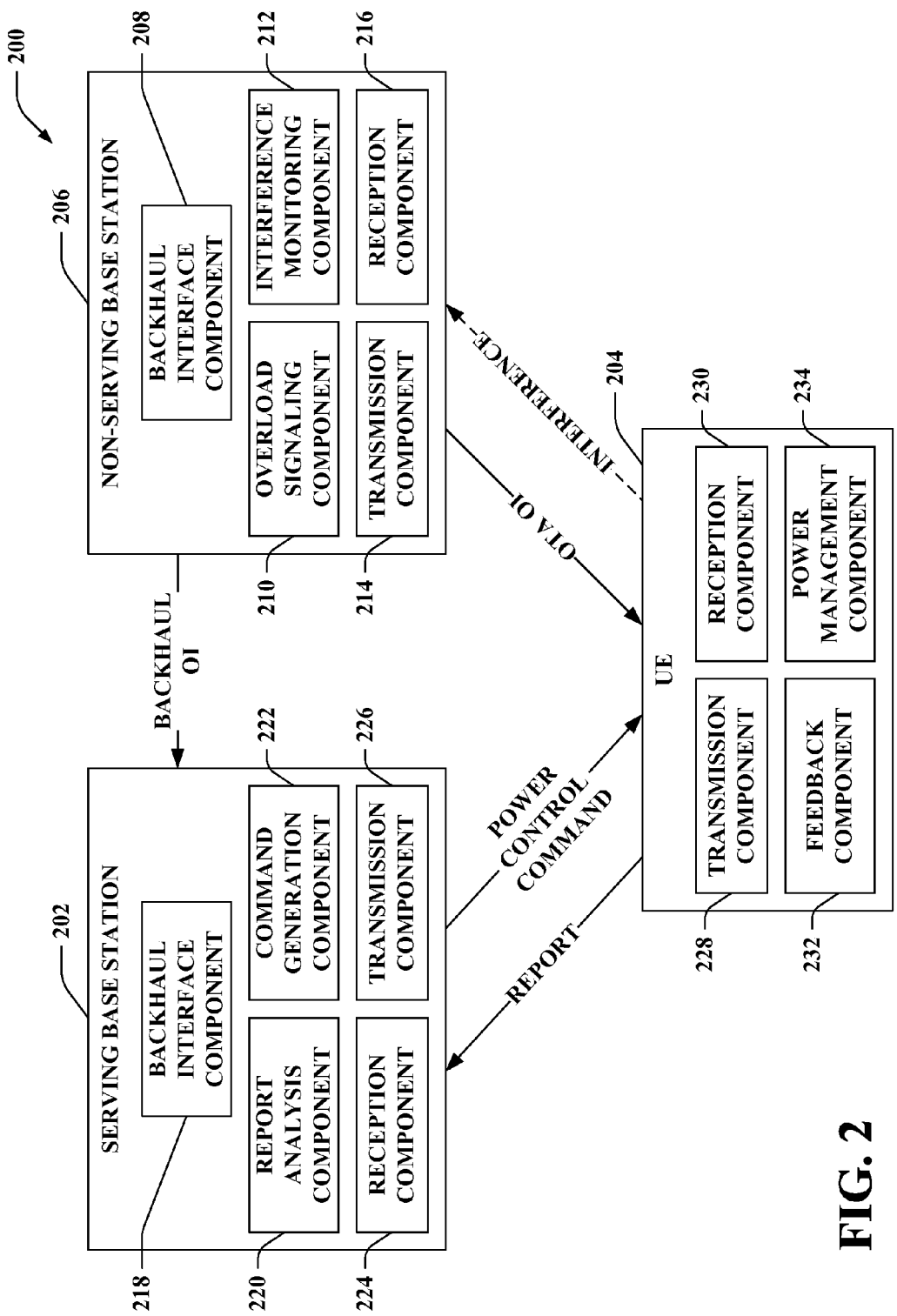
FIG. 2 is an illustration of an example system that employs over-the-air overload indicators and backhaul overload indicators in a wireless communication environment.

Now referring to FIG. 2, illustrated is a system 200 that employs over-the-air overload indicators and backhaul overload indicators in a wireless communication environment. System 200 includes a serving base station 202 that can transmit and/or receive information, signals, data, instructions, commands, bits, symbols, and the like. Serving base station 202 can communicate with a UE 204 via the forward link and/or reverse link. UE 204 can transmit and/or receive information, signals, data, instructions, commands, bits, symbols, and the like. Serving base station 202 can serve UE 204. Further, system 200 can include a non-serving base station 206 that can transmit and/or receive information, signals, data, instructions, commands, bits, symbols, and the like. Moreover, although not shown, it is contemplated that any number of base stations similar to serving base station 202 and/or non-serving base station 206 can be included in system 200 and/or any number of UEs similar to UE 204 can be included in system 200.

According to an example, UE 204 can be served by serving base station 202. Following this example, when sending an uplink transmission to serving base station 202, UE 204 can cause interference to non-serving base station 206 (e.g., associated with a neighboring cell). For instance, UE 204 can be positioned near an edge of a cell associated with serving base station 202, such that UE 204 can be located close to the neighboring cell associated with non-serving base station 206; yet, it is to be appreciated that the claimed subject matter is not so limited. Moreover, it is also to be appreciated, yet not shown, that serving base station 202 and non-serving base station 206 can be substantially similar (e.g., non-serving base station 206 can serve a different UE (not shown) that can cause interference to serving base station 202).

Non-serving base station 206 can include a backhaul interface component 208, an overload signaling component 210, an interference monitoring component 212, a transmission component 214, and/or a reception component 216. Transmission component 214 and reception component 216 can respectively send and receive signals over an air interface. Moreover, backhaul interface component 208 can exchange messages with a disparate base station (e.g., serving base station 202) over a backhaul (e.g., an X2 interface).

Reception component 216 can receive an uplink transmission sent from UE 204. Since UE 204 can be served by serving base station 202, the uplink transmission received by reception component 216 of non-serving base station 206 can be uplink interference. Moreover, although not shown, it is contemplated that reception component 216 can receive uplink transmission(s) sent from disparate UE(s). The disparate UE(s) can include UE(s) served by non-serving base station 206 and/or UE(s) served by base station(s) (e.g., serving base station 202, differing base station(s) (not shown)) other than non-serving base station 206. Uplink transmission(s) received by reception component 216 of non-serving base station 206 from UE(s) served by base station(s) other than non-serving base station 206 can also be uplink interference.

Interference monitoring component 212 can measure the uplink interference cause by UE(s) served by base station(s) other than non-serving base station 206 obtained by reception component 216 of non-serving base station 206. For instance, interference monitoring component 212 can measure an interference over thermal (IoT) level. By way of example, interference monitoring component 212 can measure an uplink interference level of the uplink transmission sent by UE 204 (as well as other uplink transmission(s) sent by other UE(s) in neighboring cell(s)).

Further, overload signaling component 210 can compare the interference level measured by interference monitoring component 212 to a threshold (or a set of thresholds). Overload signaling component 210 can set a value for overload indicator(s) based upon the comparison. For example, the value set by overload signaling component 210 can be one of overloaded or not overloaded (e.g., conveyed by one bit). Following this example, if the interference level measured by interference monitoring component 212 exceeds a threshold, then non-serving base station 206 can be recognized as being overloaded and the value set by overload signaling component 210 can signify that non-serving base station 206 is overloaded. Otherwise, if the interference level measured by interference monitoring component 212 is less than or equal to the threshold, then non-serving base station 206 can be recognized as being not overloaded and the value set by overload signaling component 210 can signify that non-serving base station 206 is not overloaded. By way of another example, the value set by overload signaling component 210 can be one of high interference, medium interference, or low interference (e.g., the interference level measured by interference monitoring component 212 can be compared to two thresholds). Yet, it is to be appreciated that the claimed subject matter is not limited to the foregoing examples.

Overload signaling component 210 can generate an over-the-air overload indicator and/or a backhaul overload indicator, each of which can include the set value (e.g., overloaded versus not overloaded, high interference versus medium interference versus low interference). According to various examples described herein, overload signaling component 210 can generate both an over-the-air overload indicator and a backhaul overload indicator. Pursuant to other examples set forth herein, overload signaling component 210 can generate an over-the-air overload indicator without generating a backhaul overload indicator. Yet, it is also contemplated that overload signaling component 210 can generate a backhaul overload indicator without generating an over-the-air overload indicator. While overload signaling component 210 is described as generating an over-the-air overload indicator and/or a backhaul overload indicator, it is to be appreciated that separate components can respectively yield an over-the-air overload indicator and a backhaul overload indicator (not shown).

Pursuant to the example depicted in FIG. 2, overload signaling component 210 can generate both an over-the-air overload indicator and a backhaul overload indicator. Further to this example, transmission component 214 can send the over-the-air overload indicator (OTA OI) over the air interface (e.g., on the downlink) Moreover, backhaul interface component 208 can send the backhaul overload indicator (backhaul OI) over the X2 interface.

Serving base station 202 can include a backhaul interface component 218, a report analysis component 220, a command generation component 222, a reception component 224, and/or a transmission component 226. Transmission component 226 can send signals over the air interface and reception component 224 can receive signals over the air interface. Further, backhaul interface component 218 can exchange messages over the backhaul (e.g., the X2 interface).

For example, backhaul interface component 218 can receive the backhaul overload indicator sent from non-serving base station 206 over the X2 interface. Command generation component 222 can yield a power control command based at least in part upon the backhaul overload indicator received by backhaul interface component 218 from non-serving base station 206. Yet, the power control command can also be generated based at least in part upon a report received from UE 204 as described below. The power control command yielded by command generation component 222 can manage an adjustment of a transmit power spectral density (PSD) of UE 204. Further, the power control command generated by command generation component 222 can be sent in a Physical Downlink Control Channel (PDCCH), which can be sent by transmission component 226 to UE 204.

For example, command generation component 222 can cause respective transmit PSD(s) of UE(s) (e.g., UE 204, disparate UE(s) (not shown)) being served by serving base station 202 to be reduced upon backhaul interface component 218 receiving a backhaul overload indicator that signifies that non-serving base station 206 is overloaded. Command generation component 222 can cause reduction in transmit PSD(s) by yielding respective power control command(s) for the UE(s).

By way of yet another example, an amount of PSD reduction for UE 204 in response to receipt of the backhaul overload indicator by backhaul interface component 218 from non-serving base station 206 can depend on an amount of interference caused by UE 204. Following this example, the amount of PSD reduction can be a function of a difference in path loss from UE 204 to serving base station 202 versus from UE 204 to non-serving base station 206. The difference in path loss, for instance, can be computed by command generation component 222 based on a measurement report from UE 204.

Moreover, UE 204 can include a transmission component 228, a reception component 230, a feedback component 232, and/or a power management component 234. Transmission component 228 can send signals over the air interface and reception component 230 can receive signals over the air interface. As described above, transmission component 228 can send the uplink transmission to serving base station 202, for example; the uplink transmission sent to serving base station 202 can cause uplink interference to non-serving base station 206 (e.g., obtained by reception component 216, measured by interference monitoring component 212).

Further, reception component 230 can receive the over-the-air overload indicator sent by non-serving base station 206 (e.g., yielded by overload signaling component 210 and sent by transmission component 214). Power management component 234 can adjust a transmit PSD of UE 204 based upon the over-the-air overload indicator received by reception component 230 from non-serving base station 206. Adjustment of the transmit PSD of UE 204 as a function of the over-the-air overload indicator can be faster than adjustment of the transmit PSD of UE 204 based upon a power control command formed at serving base station 202 by command generation component 222 as a function of the backhaul overload indicator. For instance, adjustment of the transmit PSD of UE 204 based upon the over-the-air overload indicator can be faster due to backhaul delay associated with the backhaul overload indicator, delay associated with power control command generation (e.g., by command generation component 222), and so forth.

Feedback component 232 can yield a report that includes power related information concerning UE 204 that can be sent by transmission component 228 to serving base station 202. For example, the report generated by feedback component 232 can include information related to the over-the-air overload indicator (e.g., received by reception component 230 from non-serving base station 206, whether non-serving base station 206 is overloaded versus not overloaded, whether non-serving base station 206 is experiencing high interference versus medium interference versus low interference), the transmit PSD after the adjustment (e.g., by power management component 234) based upon the over-the-air overload indicator, a power headroom (e.g., difference between a maximum transmit PSD and the transmit PSD after the adjustment), a combination thereof, and so forth.

Reception component 224 of serving base station 202 can receive the report generated by feedback component 232 of UE 204. Further, report analysis component 220 can evaluate the report and can cause command generation component 222 to generate the power control command for UE 204 as a function of the report sent from UE 204 as well as the backhaul overload indicator received by backhaul interface component 218 from non-serving base station 206 over the X2 interface. Thus, command generation component 222 can issue the power control command by taking the report from UE 204 into consideration.

The following is an illustration depicting operation of system 200. UE 204 can send an uplink transmission (e.g., using transmission component 228) to serving base station 202, which can cause interference (e.g., uplink interference) at non-serving base station 206. Interference monitoring component 212 of non-serving base station 206 can measure the interference received (e.g., by reception component 216, from UE 204, from disparate UE(s) not served by non-serving base station 206) at non-serving base station 206. Moreover, overload signaling component 210 can generate an over-the-air overload indicator and a backhaul overload indicator that include a value set as a function of the measured interference. For instance, the over-the-air overload indicator and the backhaul overload indicator can carry the same value (e.g., non-serving base station 206 is overloaded versus not overloaded, non-serving base station 206 is experiencing high interference versus medium interference versus low interference). Further, transmission component 214 can send the over-the-air overload indicator over the air interface to UE 204, and backhaul interface component 208 can send the backhaul overload indicator over the backhaul (e.g., X2 interface) to serving base station 202.

Reception component 230 of UE 204 can receive the over-the-air overload indicator, and power management component 234 can adjust a transmit PSD of UE 204 based upon the over-the-air overload indicator. For instance, if the over-the-air overload indicator specifies that non-serving base station 206 is overloaded, then power management component 234 can reduce the transmit PSD of UE 204. The amount of the transmit PSD reduction as controlled by power management component 234 can depend on an amount of interference caused by UE 204 (e.g., which can be a function of a difference in path loss from UE 204 to serving base station 202 versus from UE 204 to non-serving base station 206). According to another example, if the over-the-air overload indicator specifies that non-serving base station 206 is not overloaded, then power management component 234 can increase the transmit PSD of UE 204 or inhibit adjusting the transmit PSD of UE 204 (e.g., depending on the power headroom of UE 204). Moreover, feedback component 232 can form a report that includes power related information concerning UE 204; the power related information can include information pertaining to the over-the-air overload indicator, the transmit PSD after the adjustment by power management component 234 based upon the over-the-air overload indicator, the power headroom, a combination thereof, and so forth. The report can be sent by transmission component 228 over the uplink to serving base station 202.

Reception component 224 of serving base station 202 can receive the report generated by feedback component 232 of UE 204. Moreover, backhaul interface component 218 can receive the backhaul overload indicator sent by non-serving base station 206. Report analysis component 220 can evaluate the report obtained from UE 204. Further, command generation component 222 can yield a power control command for UE 204 based upon the backhaul overload indicator and the report obtained from UE 204 as evaluated by report analysis component 220.

For example, report analysis component 220 can recognize from the report that UE 204 received the over-the-air overload indicator, the over-the-air overload indicator included a value signifying that non-serving base station 206 is overloaded, and a transmit PSD of UE 204 after adjustment based upon the over-the-air overload indicator. Following this example, command generation component 222 can identify that the backhaul overload indicator similarly includes a value signifying that non-serving base station 206 is overloaded. Thus, command generation component 222 can evaluate whether to issue a power control command that causes further adjustment of the transmit PSD of UE 204. Accordingly, command generation component 222 can mitigate improperly over adjusting the transmit PSD of UE 204 (e.g., adjusting the transmit PSD of UE 204 a second time based upon the backhaul overload indicator when power management component 234 already adjusted the transmit PSD of UE 204 based upon the over-the-air overload indicator where the backhaul overload indicator and the over-the-air overload indicator are concurrently supplied by non-serving base station 206).

According to another example, report analysis component 220 can recognize from the report that UE 204 received the over-the-air overload indicator, the overload indicator included a value signifying that non-serving base station 206 is not overloaded, a transmit power PSD of UE 204 after an increase based upon the over-the-air overload indicator, and a power headroom. Pursuant to this example, command generation component 222 can recognize that the backhaul overload indicator similarly includes a value signifying that non-serving base station 206 is not overloaded. Thus, command generation component 222 can evaluate whether to issue a power control command that causes further adjustment of the transmit PSD of UE 204. Accordingly, command generation component 222 can mitigate improperly over adjusting the transmit PSD of UE 204 (e.g., adjusting the transmit PSD of UE 204 a second time based upon the backhaul overload indicator when power management component 234 already adjusted the transmit PSD of UE 204 based upon the over-the-air overload indicator where the backhaul overload indicator and the over-the-air overload indicator are concurrently supplied by non-serving base station 206).

In accordance with yet another example, report analysis component 220 can recognize from the report that UE 204 received the over-the-air overload indicator, the overload indicator included a value signifying that non-serving base station 206 is not overloaded, a transmit power PSD of UE 204 remained unaltered based upon the over-the-air overload indicator, and a power headroom. Pursuant to this example, command generation component 222 can recognize that the backhaul overload indicator similarly includes a value signifying that non-serving base station 206 is not overloaded. Thus, command generation component 222 can evaluate whether to issue a power control command that causes the transmit PSD of UE 204 to be adjusted (e.g., the evaluation can be based at least in part upon the power headroom).

Figure 3:
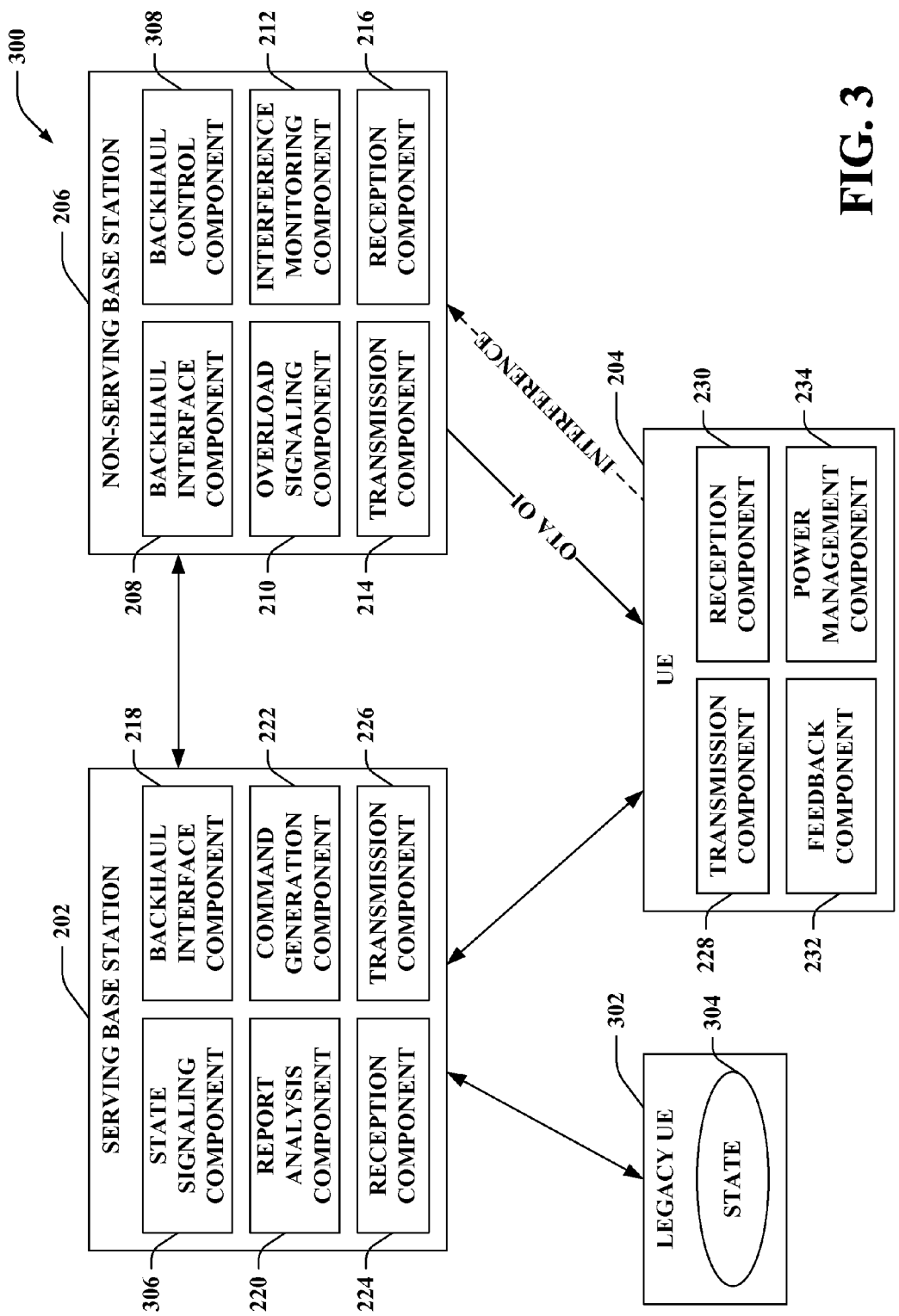
FIG. 3 is an illustration of an example system that selectively disables transmission of a backhaul overload indicator in a wireless communication environment.

Now turning to FIG. 3, illustrated is a system 300 that selectively disables transmission of a backhaul overload indicator in a wireless communication environment. System 300 includes serving base station 202, non-serving base station 206, UE 204, and a legacy UE 302. Serving base station 202 can include backhaul interface component 218, report analysis component 220, command generation component 222, reception component 224, and/or transmission component 226 as described herein. Further, non-serving base station 206 can include backhaul interface component 208, overload signaling component 210, interference monitoring component 212, transmission component 214, and/or reception component 216 as set forth herein. Moreover, UE 204 can include transmission component 228, reception component 230, feedback component 232, and/or power management component 234 as described herein.

Legacy UE 302, for example, can be a Release 8 UE. Moreover, legacy UE 302 can be served by serving base station 202. Although not shown, it is contemplated that legacy UE 302 can include a transmission component (e.g., similar to transmission component 228 of UE 204) that sends a transmission over the air interface, a reception component (e.g., similar to reception component 230 of UE 204) that receives a transmission over the air interface, and a power management component (e.g., similar to power management component 234 of UE 204) that adjusts a transmit PSD of legacy UE 302 based upon a power control command received from serving base station 202 (e.g., issued by command generation component 222 in response to a backhaul overload indicator received by serving base station 202). Legacy UE 302, however, can be unable to receive an over-the-air overload indicator sent by non-serving base station 206.

Further, legacy UE 302 can be in a state 304. According to an example, state 304 can be one of Radio Resource Control IDLE (RRC_IDLE) state (e.g., idle state) or RRC_CONNECTED state (e.g., active state). In RRC_IDLE state, legacy UE 302 can monitor a paging channel to detect incoming calls, acquire system information, and perform neighboring cell measurement and cell selection (cell reselection). In RRC_CONNECTED state, legacy UE 302 can send data to or receive data from a network; thus, legacy UE 302 can monitor control channels associated with a shared data channel to determine if legacy UE 302 is scheduled for uplink or downlink data transmission, and can provide channel quality and feedback information to serving base station 202. Further, in RRC_CONNECTED state, legacy UE 302 can perform neighboring cell measurement and measurement reporting based on a configuration provided by serving base station 202.

Serving base station 202 can further include a state signaling component 306. State signaling component 306 can monitor state 304 of legacy UE 302. Moreover, state signaling component 306 can monitor respective state(s) of other legacy UE(s) (not shown) served by serving base station 202. Further, state signaling component 306 can signal information that indicates the state(s) (e.g., state 304, respective state(s) of the other legacy UE(s) served by serving base station 202) of the legacy UE(s) (e.g., legacy UE 302, the other legacy UE(s) served by serving base station 202). The information can be transmitted over the backhaul by backhaul interface component 218 to neighboring base station(s) (e.g., non-serving base station 206).

Further, the information can be received by backhaul interface component 208 of non-serving base station 206. Moreover, non-serving base station 206 can include a backhaul control component 308 that can manage transmission of a backhaul overload indicator over the X2 interface based upon the information.

For example, state signaling component 306 can detect that serving base station 202 is not serving a legacy UE in RRC_CONNECTED state (e.g., serving base station 202 is not serving a legacy UE, legacy UE 302 and/or other legacy UE(s) served by serving base station 202 are in RRC_IDLE state). Following this example, state signaling component 306 can signal information to neighboring base station(s) (e.g., non-serving base station 206), where the information can indicate that no legacy UE is served by serving base station 202 and is in RRC_CONNECTED state. The information can be sent over the backhaul by backhaul interface component 218. Backhaul interface component 208 of non-serving base station 206 can receive the information from serving base station 202, and backhaul control component 308 can cause non-serving base station 206 to inhibit sending a backhaul overload indicator via the backhaul when the information indicates that no legacy UE is served by serving base station 202 and is in RRC_CONNECTED state. According to this example, an over-the-air overload indicator can be yielded by overload signaling component 210; the over-the-air overload indicator can be sent over an air interface by transmission component 214 to non-legacy UE(s) (e.g., UE 204) without backhaul interface component 208 sending a backhaul overload indicator. By inhibiting transmission of the backhaul overload indicator, backhaul capacity can be saved.

By way of another example, state signaling component 306 can detect that serving base station is serving a legacy UE in RRC_CONNECTED state (e.g., legacy UE 302 is in RRC_CONNECTED state). State signaling component 306 can signal information to neighboring base station(s) (e.g., non-serving base station 206) that indicates that a legacy UE (e.g., legacy UE 302) served by serving base station 202 is in RRC_CONNECTED state. The information can be transmitted over the backhaul by backhaul interface component 218. Backhaul interface component 208 of non-serving base station 206 can receive the information from serving base station 202, and backhaul control component 308 can cause non-serving base station to send a backhaul overload indicator via the backhaul when the information indicates that a legacy UE served by serving base station 202 is in RRC_CONNECTED state. In accordance with this example, both an over-the-air overload indicator and a backhaul overload indicator can be yielded by overload signaling component 210. Hence, the over-the-air overload indicator can be sent over an air interface by transmission component 214 and the backhaul overload indicator can be sent over the backhaul by backhaul interface component 208. It is contemplated that this example can be similar to the example scenario described in connection with FIG. 2 where both the over-the-air overload indicator and the backhaul overload indicator are sent by non-serving base station 206.

Figure 4:
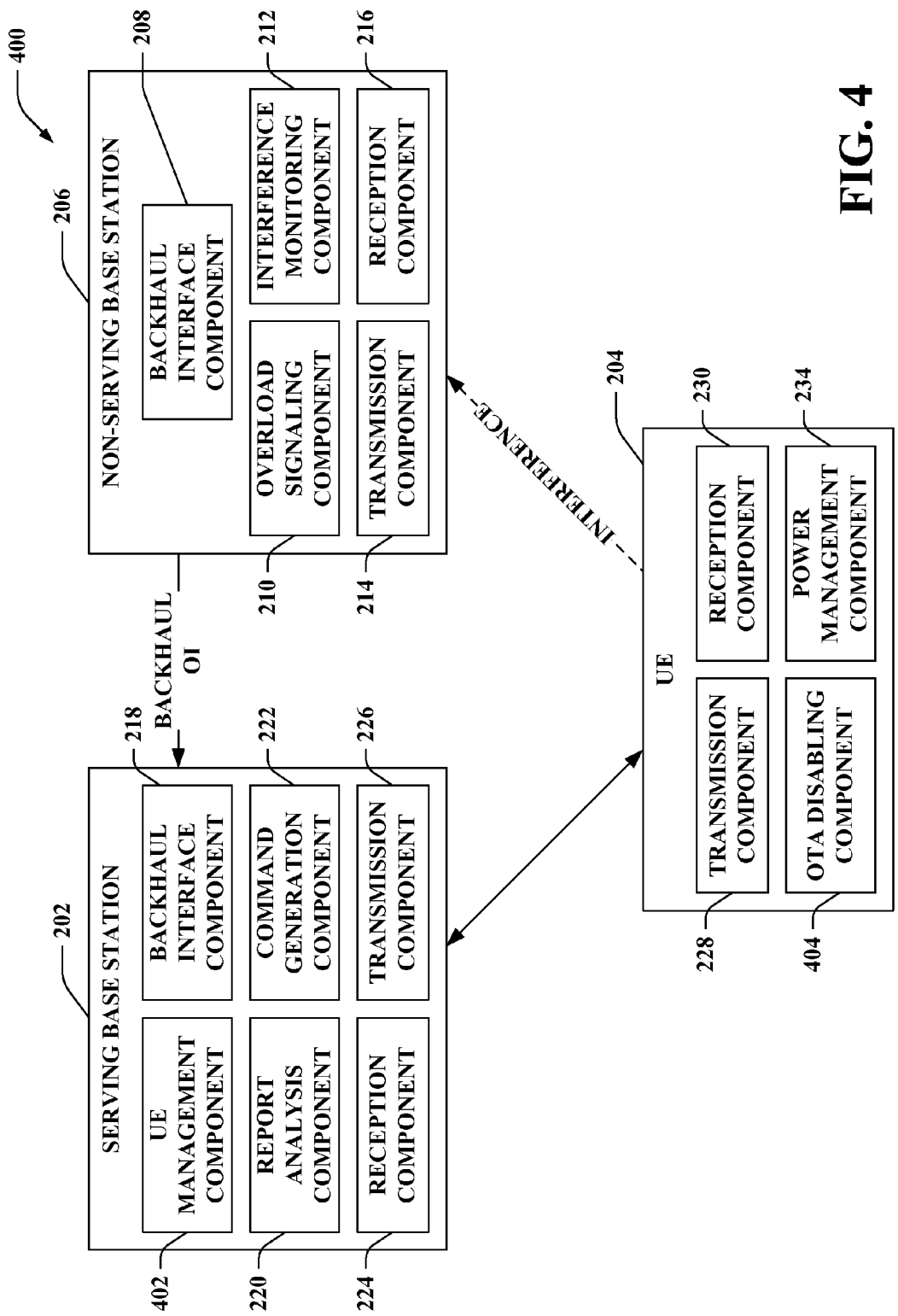
FIG. 4 is an illustration of an example system that manages a type of overload indicator utilized by a UE in a wireless communication environment.

Referring to FIG. 4, illustrated is a system 400 that manages a type of overload indicator utilized by a UE in a wireless communication environment. System 400 includes serving base station 202, non-serving base station 206, and UE 204. Serving base station 202 can include backhaul interface component 218, report analysis component 220, command generation component 222, reception component 224, and/or transmission component 226 as described herein. Further, non-serving base station 206 can include backhaul interface component 208, overload signaling component 210, interference monitoring component 212, transmission component 214, and/or reception component 216 as set forth herein. Moreover, UE 204 can include transmission component 228, reception component 230, and/or power management component 234 as described herein. Although not shown, it is contemplated that UE 204 can further include a feedback component (e.g., feedback component 232 of FIG. 2).

Serving base station 202 can further include a UE management component 402 that can configure UE 204, which is served by serving base station 202, to either employ or ignore an over-the-air overload indicator received thereby. According to an example, if UE management component 402 configures UE 204 to employ received over-the-air overload indicators, then this example can be similar to the example scenario described in connection with FIG. 2 where both the over-the-air overload indicator and the backhaul overload indicator are sent by non-serving base station 206.

Pursuant to another example, UE management component 402 can configure UE 204 to ignore over-the-air overload indicators. For instance, configuration information can be sent over the air interface by transmission component 226 to UE 204. Reception component 230 of UE 204 can obtain the configuration information. Moreover, UE 204 can include an OTA disabling component 404 that can cause UE 204 to selectively ignore over-the-air overload indicators based upon the configuration information received from serving base station 202. For example, non-serving base station 206 can generate and send both an over-the-air overload indicator and a backhaul overload indicator; however, power management component 234 of UE 204 can inhibit adjusting a transmit PSD of UE 204 based upon the over-the-air overload indicator when OTA disabling component 404 is configured to selectively ignore over-the-air overload indicators. Yet, the claimed subject matter is not limited to the aforementioned example as it is contemplated that non-serving base station 206 need not generate and send the over-the-air overload indicator under such scenario.

When UE 204 is configured to ignore over-the-air overload indicators (e.g., sent by non-serving base station 206), adjustment of a transmit PSD of UE 204 can be effectuated based upon a power control command received from serving base station 202. Further, the power control command can be yielded by command generation component 222 of serving base station as a function of a backhaul overload indicator exchanged over the X2 interface from non-serving base station 206.

Disabling use of over-the-air overload indicators by UE 204 can cause UE 204 (e.g., Release 9/10 UE) to behave similarly to a legacy UE (e.g., legacy UE 302 of FIG. 3, Release 8 UE); thus, UE 204 can degenerate to providing similar capabilities as compared to a legacy UE. Yet, overhead on L1 capacity can be saved by disabling use of the over-the-air overload indicators.

Figure 5:
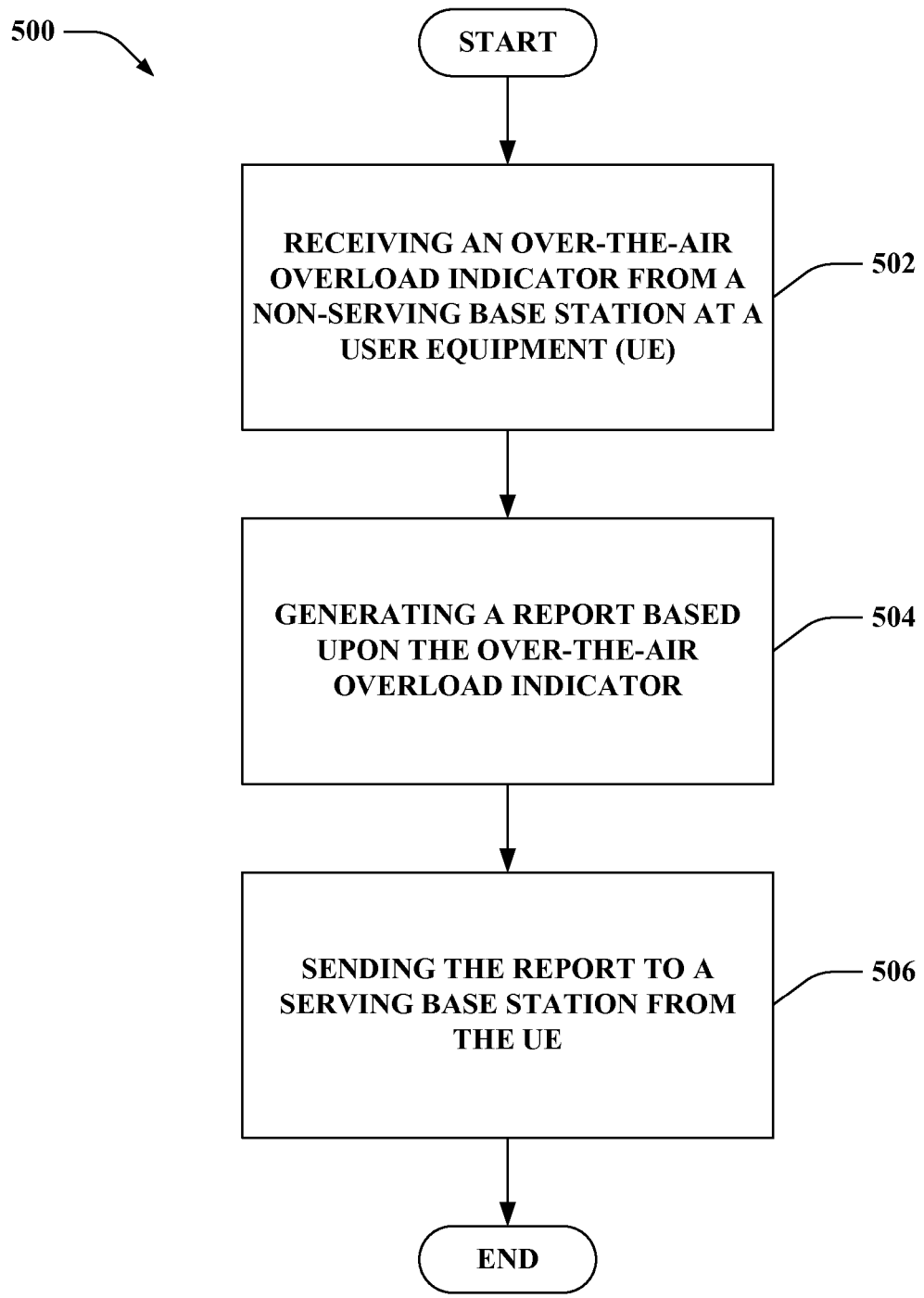
FIG. 5 is an illustration of an example methodology that facilitates responding to overload indicators in a wireless communication environment.
Figure 6:
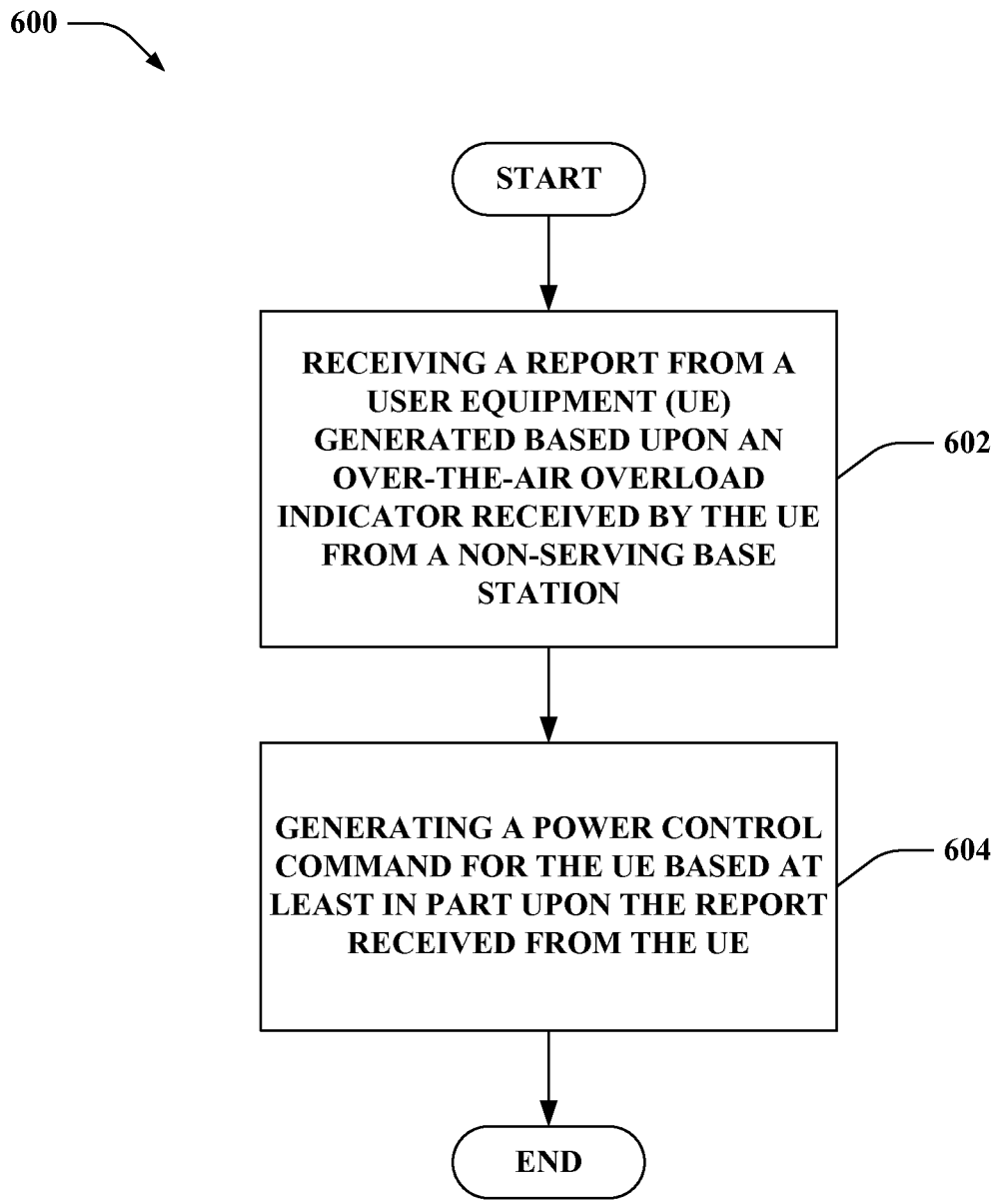
FIG. 6 is an illustration of an example methodology that facilitates responding to overload indicators in a wireless communication environment.

Referring to FIGS. 5-6, methodologies relating to responding to overload indicator(s) in a wireless communication environment are illustrated. While, for purposes of simplicity of explanation, the methodologies are shown and described as a series of acts, it is to be understood and appreciated that the methodologies are not limited by the order of acts, as some acts can, in accordance with one or more embodiments, occur in different orders and/or concurrently with other acts from that shown and described herein. For example, those skilled in the art will understand and appreciate that a methodology could alternatively be represented as a series of interrelated states or events, such as in a state diagram. Moreover, not all illustrated acts can be required to implement a methodology in accordance with one or more embodiments.

With reference to FIG. 5, illustrated is a methodology 500 that facilitates responding to overload indicators in a wireless communication environment. At 502, an over-the-air overload indicator can be received from a non-serving base station at a user equipment (UE). The over-the-air overload indicator can specify that the non-serving base station is one of overloaded or not overloaded, for instance. According to another example, the over-the-air overload indicator can specify that the non-serving base station is experiencing one of high interference, medium interference, or low interference. At 504, a report can be generated based upon the over-the-air overload indicator. For example, the report can include information related to at least one of the over-the-air overload indicator, a transmit power spectral density (PSD) of the UE after being adjusted based upon the over-the-air overload indicator, or a power headroom of the UE. According to an example, a transmit PSD of the UE can be adjusted based upon the over-the-air overload indicator received from the non-serving base station. At 506, the report can be sent to a serving base station from the UE.

Pursuant to another example, a power control command can be received from the serving base station at the UE. Following this example, the power control command can be a function of a backhaul overload indicator received by the serving base station from the non-serving base station and the report sent by the UE. For instance, the power control command can be received in a Physical Downlink Control Channel (PDCCH) from the serving base station. Further, a transmit PSD of the UE can be adjusted based upon the power control command.

By way of yet another example, the UE can be configured by the serving base station to ignore the over-the-air overload indicator sent from the non-serving base station. Thus, a power control command can be received from the serving base station at the UE, wherein the power control command can be a function of a backhaul overload indicator received by the serving base station from the non-serving base station. Moreover, a transmit PSD of the UE can be adjusted based upon the power control command without alteration based upon the over-the-air overload indicator sent from the non-serving base station.

Now turning to FIG. 6, illustrated is a methodology 600 that facilitates responding to overload indicators in a wireless communication environment. At 602, a report from a user equipment (UE) generated based upon an over-the-air overload indicator received by the UE from a non-serving base station can be received. For example, the report can include information related to at least one of the over-the-air overload indicator, a transmit power spectral density (PSD) of the UE after being adjusted based upon the over-the-air overload indicator, or a power headroom of the UE. At 604, a power control command for the UE can be generated based at least in part upon the report received from the UE. By way of example, the power control command for the UE can further be generated based upon a backhaul overload indicator received from the non-serving base station over a backhaul. Moreover, the power control command can be transmitted to the UE over a downlink in a Physical Downlink Control Channel (PDCCH).

According to another example, the UE can be configured by the serving base station to ignore the over-the-air overload indicator received by the UE from the non-serving base station. In accordance with this example, the power control command for the UE can be generated based upon the backhaul overload indicator received from the non-serving base station over the backhaul.

By way of yet another example, information can be signaled to the non-serving base station that selectively causes the non-serving base station to either send or inhibit sending a backhaul overload indicator over a backhaul as a function of served UE type (e.g., legacy UE versus non-legacy UE) and state (e.g., active state versus idle state, RRC_CONNECTED state versus RRC_IDLE state). Following this example, a determination can be effectuated concerning whether the serving base station serves at least one legacy UE (e.g., Release 8 UE). If the serving base station is recognized as not serving at least one legacy UE, then the serving base station can signal information to the non-serving base station that causes the non-serving base station to inhibit sending the backhaul overload indicator over the backhaul. If the serving base station is recognized as serving at least one legacy UE, then respective states of the at least one legacy UE can be determined. If none of the at least one legacy UE served by the serving base station is recognized as being in an active state (e.g., RRC_CONNECTED state), then the serving base station can signal information to the non-serving base station that causes the non-serving base station to inhibit sending the backhaul overload indicator over the backhaul. Alternatively, if one or more of the at least one legacy UE served by the serving base station is recognized as being in active state (e.g., RRC_CONNECTED state), then the serving base station can signal information to the non-serving base station that causes the non-serving base station to send the backhaul overload indicator over the backhaul.

It will be appreciated that, in accordance with one or more aspects described herein, inferences can be made pertaining to employing over-the-air overload indicators and/or backhaul overload indicators in a wireless communication environment. As used herein, the term to "infer" or "inference" refers generally to the process of reasoning about or inferring states of the system, environment, and/or user from a set of observations as captured via events and/or data. Inference can be employed to identify a specific context or action, or can generate a probability distribution over states, for example. The inference can be probabilistic—that is, the computation of a probability distribution over states of interest based on a consideration of data and events. Inference can also refer to techniques employed for composing higher-level events from a set of events and/or data. Such inference results in the construction of new events or actions from a set of observed events and/or stored event data, whether or not the events are correlated in close temporal proximity, and whether the events and data come from one or several event and data sources.

Figure 7:
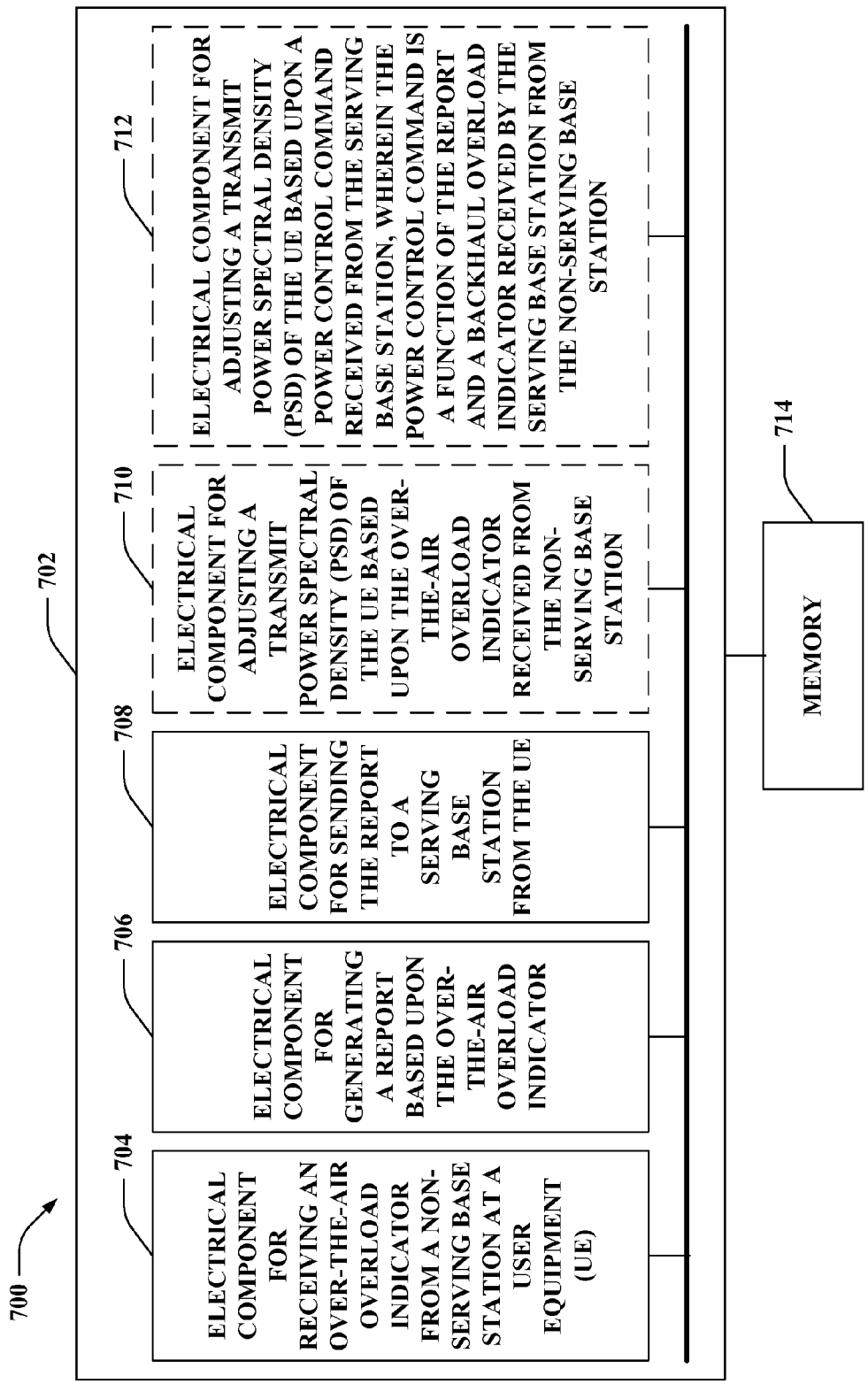
FIG. 7 is an illustration of an example system that enables utilizing overload indicators in a wireless communication environment.

With reference to FIG. 7, illustrated is a system 700 that enables utilizing overload indicators in a wireless communication environment. For example, system 700 can reside within a UE. It is to be appreciated that system 700 is represented as including functional blocks, which can be functional blocks that represent functions implemented by a processor, software, or combination thereof (e.g., firmware). System 700 includes a logical grouping 702 of electrical components that can act in conjunction. For instance, logical grouping 702 can include an electrical component for receiving an over-the-air overload indicator from a non-serving base station at a user equipment (UE) 704. Further, logical grouping 702 can include an electrical component for generating a report based upon the over-the-air overload indicator 706. Moreover, logical grouping 702 can include an electrical component for sending the report to a serving base station from the UE 708. Logical grouping 702 can also optionally include an electrical component for adjusting a transmit power spectral density (PSD) of the UE based upon the over-the-air overload indicator received from the non-serving base station 710. Moreover, logical grouping 702 can optionally include an electrical component for adjusting a transmit power spectral density (PSD) of the UE based upon a power control command received from the serving base station, wherein the power control command can be a function of the report and a backhaul overload indicator received by the serving base station from the non-serving base station 712. Additionally, system 700 can include a memory 714 that retains instructions for executing functions associated with electrical components 704, 706, 708, 710, and 712. While shown as being external to memory 714, it is to be understood that one or more of electrical components 704, 706, 708, 710, and 712 can exist within memory 714.

Figure 8:
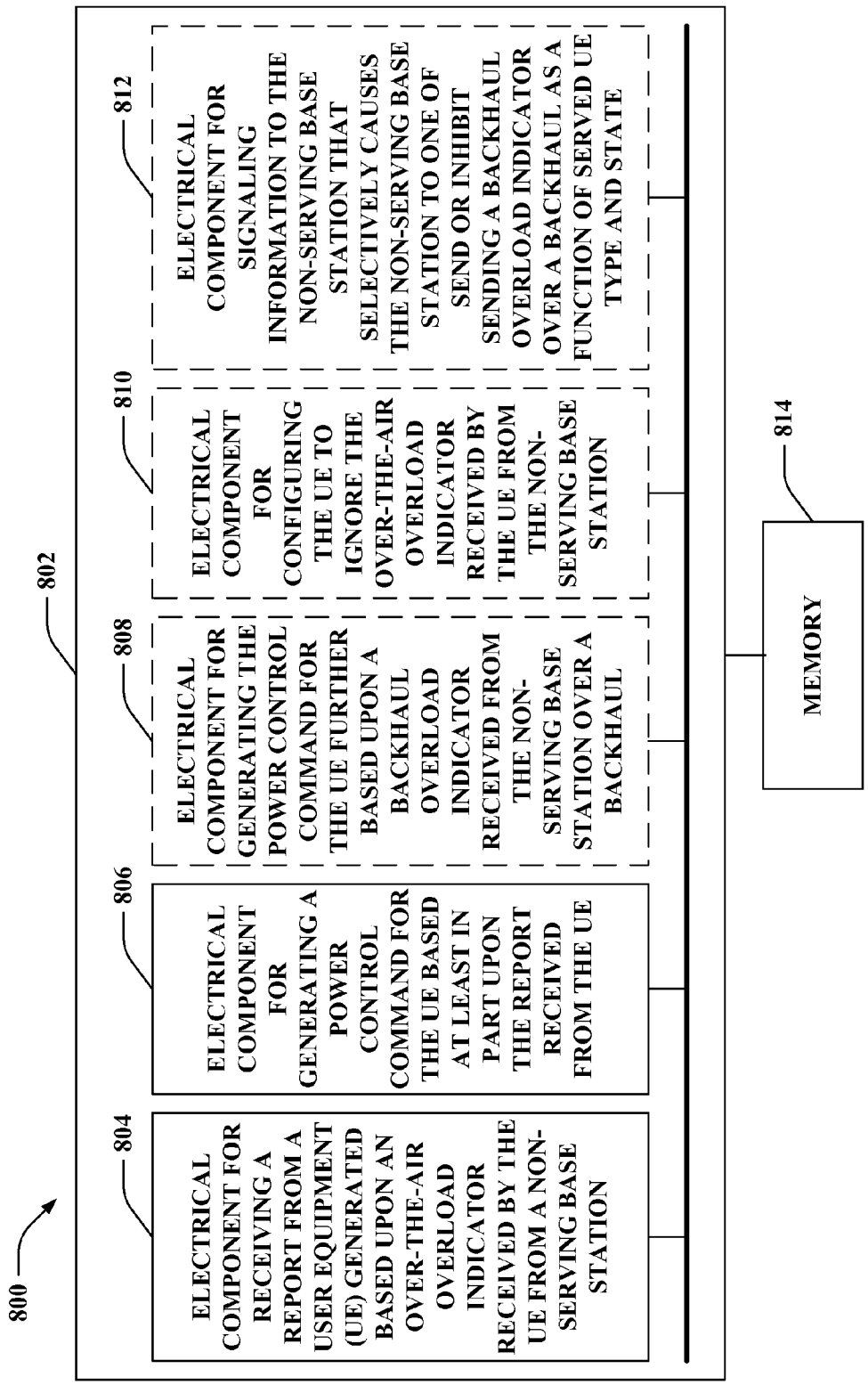
FIG. 8 is an illustration of an example system that enables employing overload indicators in a wireless communication environment.

With reference to FIG. 8, illustrated is a system 800 that enables employing overload indicators in a wireless communication environment. For example, system 800 can reside at least partially within a base station. It is to be appreciated that system 800 is represented as including functional blocks, which can be functional blocks that represent functions implemented by a processor, software, or combination thereof (e.g., firmware). System 800 includes a logical grouping 802 of electrical components that can act in conjunction. For instance, logical grouping 802 can include an electrical component for receiving a report from a user equipment (UE) generated based upon an over-the-air overload indicator received by the UE from a non-serving base station 804. Further, logical grouping 802 can include an electrical component for generating a power control command for the UE based at least in part upon the report received from the UE 806. Logical grouping 802 can also optionally include an electrical component for generating the power control command for the UE further based upon a backhaul overload indicator received from the non-serving base station over a backhaul 808. Moreover, logical grouping 802 can optionally include an electrical component for configuring the UE to ignore the over-the-air overload indicator received by the UE from the non-serving base station 810. Further, logical grouping 802 can optionally include an electrical component for signaling information to the non-serving base station that selectively causes the non-serving base station to one of send or inhibit sending a backhaul overload indicator over a backhaul as a function of served UE type and state 812. Additionally, system 800 can include a memory 814 that retains instructions for executing functions associated with electrical components 804, 806, 808, 810, and 812. While shown as being external to memory 814, it is to be understood that one or more of electrical components 804, 806, 808, 810, and 812 can exist within memory 814.

Figure 9:
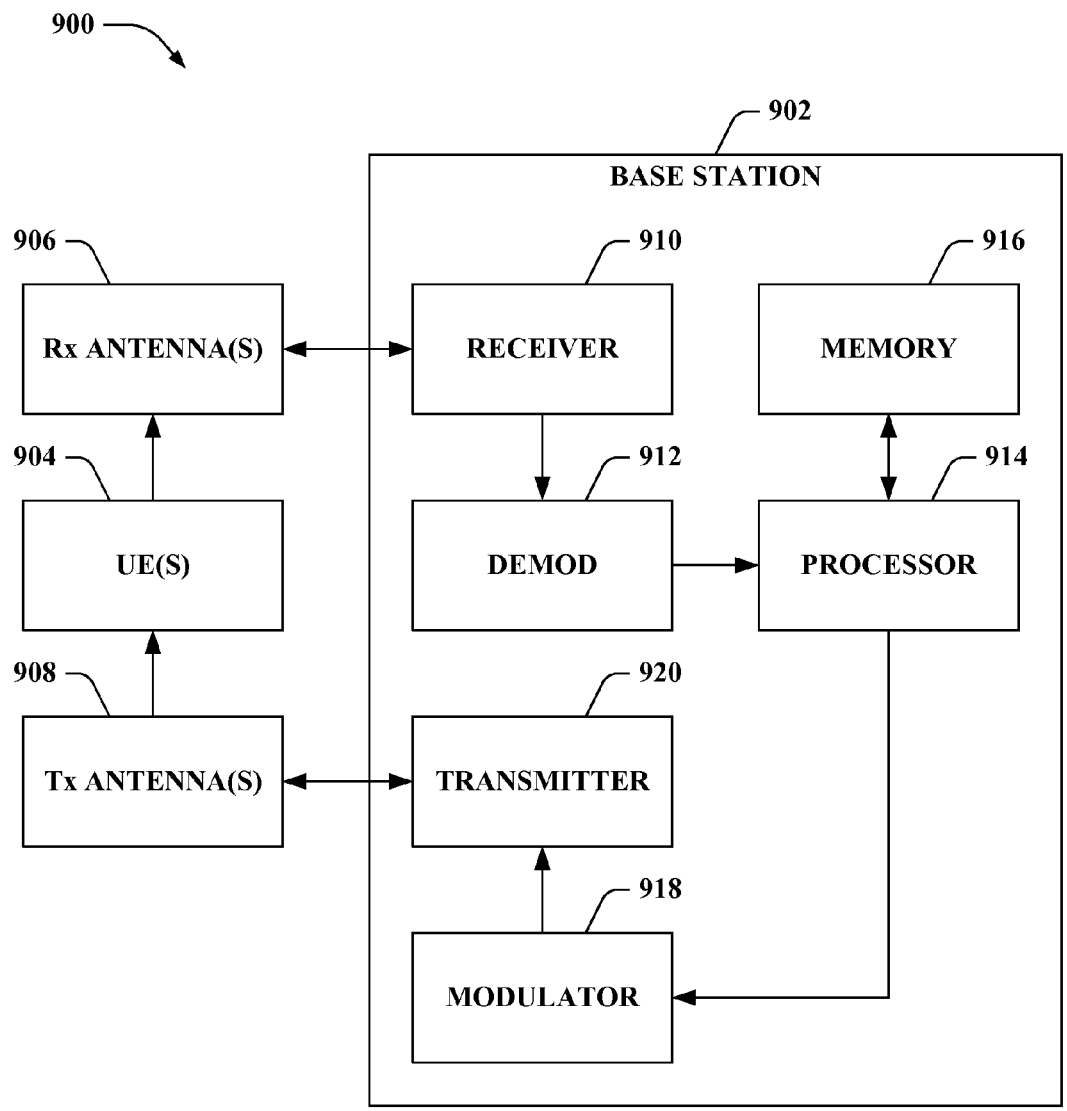
FIGS. 9-10 are illustrations of example systems that can be utilized to implement various aspects of the functionality described herein.

FIG. 9 is an illustration of a system 900 that can be utilized to implement various aspects of the functionality described herein. System 900 can include a base station 902 (e.g., serving base station 202, non-serving base station 206). Base station 902 can receive signal(s) from one or more UEs 904 via one or more receive (Rx) antennas 906 and transmit to the one or more UEs 904 via one or more transmit (Tx) antennas 908. Further, base station 902 can include a receiver 910 that receives information from receive antenna(s) 906. According to an example, receiver 910 can be operatively associated with a demodulator (demod) 912 that demodulates received information. Demodulated symbols can be analyzed by a processor 914. Processor 914 can be coupled to memory 916, which can store data to be transmitted to or received from UE(s) 904 and/or any other suitable protocols, algorithms, information, etc. related to performing the various actions and functions set forth herein. For example, base station 902 can employ processor 914 to perform methodology 600 and/or other similar and appropriate methodologies. Base station 902 can further include a modulator 918 that can multiplex a signal for transmission by a transmitter 920 through antenna(s) 908.

Processor 914 can be a processor dedicated to analyzing information received by receiver 910, dedicated to generating information for transmission by transmitter 920, or dedicated to controlling one or more components of base station 902. According to another example, processor 914 can analyze information received by receiver 910, generate information for transmission by transmitter 920, and control one or more components of base station 902. The one or more components of base station 902 can include, for example, backhaul interface component 218 (e.g., backhaul interface component 208), report analysis component 220, command generation component 222, reception component 224 (e.g., reception component 216), transmission component 226 (e.g., transmission component 214), overload signaling component 210, interference monitoring component 212, state signaling component 306, backhaul control component 308, and/or UE management component 402. Moreover, although not shown, it is contemplated that the one or more components of base station 902 can be part of processor 914 or a plurality of processors (not shown).

Figure 10:
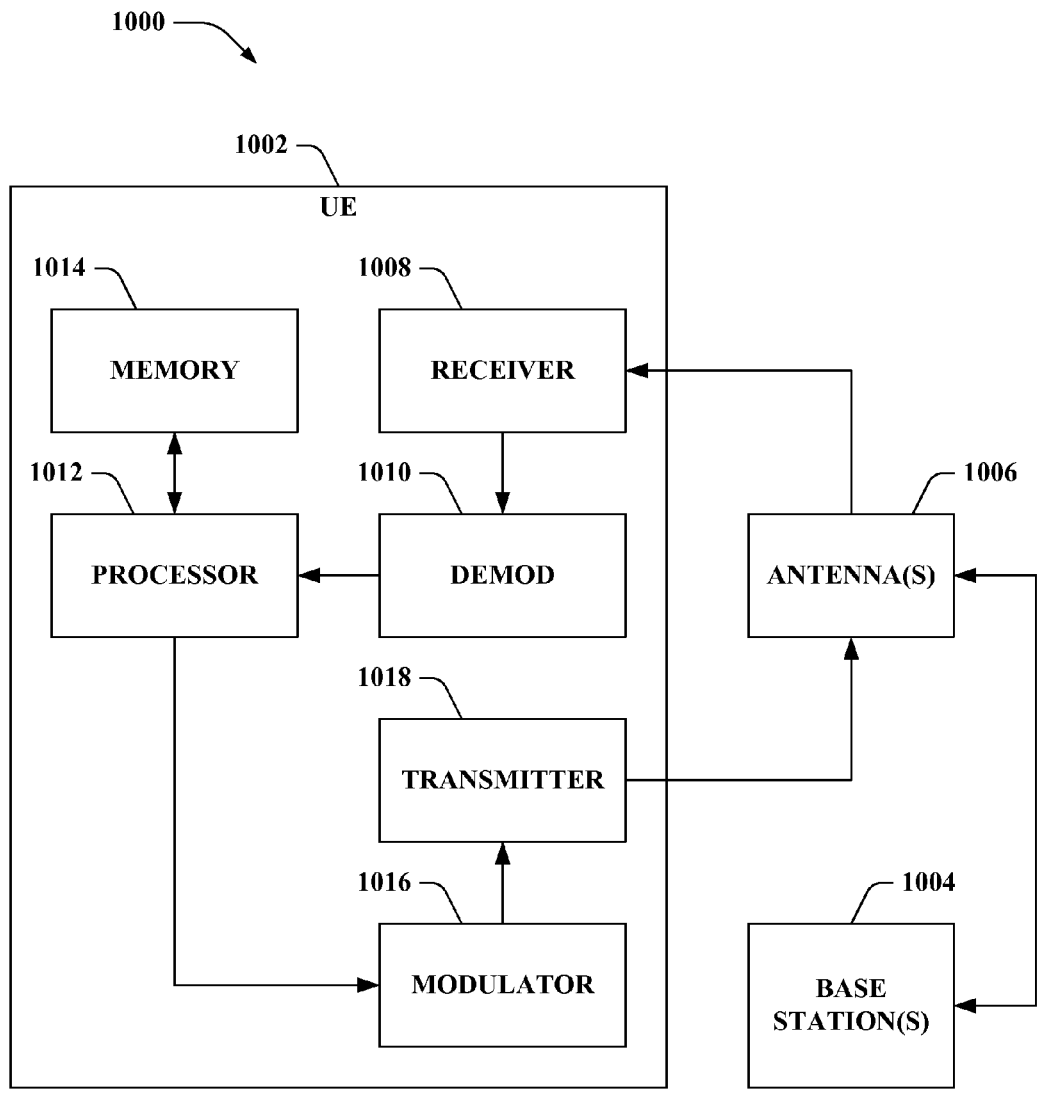

FIG. 10 is an illustration of a system 1000 that can be utilized to implement various aspects of the functionality described herein. System 1000 can include a UE 1002 (e.g., UE 204, legacy UE 302). UE 1002 can receive signal(s) from one or more base stations 1004 and/or transmit to one or more base stations 1004 via one or more antennas 1006. Further, UE 1002 can include a receiver 1008 that receives information from antenna(s) 1006. According to an example, receiver 1008 can be operatively associated with a demodulator (demod) 1010 that demodulates received information. Demodulated symbols can be analyzed by a processor 1012. Processor 1012 can be coupled to memory 1014, which can store data to be transmitted to or received from base station(s) 1004 and/or any other suitable protocols, algorithms, information, etc. related to performing the various actions and functions set forth herein. For example, UE 1002 can employ processor 1012 to perform methodology 500 and/or other similar and appropriate methodologies. UE 1002 can further include a modulator 1016 that can multiplex a signal for transmission by a transmitter 1018 through antenna(s) 1006.

Processor 1012 can be a processor dedicated to analyzing information received by receiver 1008, dedicated to generating information for transmission by transmitter 1018, or dedicated to controlling one or more components of UE 1002. According to another example, processor 1012 can analyze information received by receiver 1008, generate information for transmission by transmitter 1018, and control one or more components of UE 1002. The one or more components of UE 1002 can include, for example, transmission component 228, reception component 230, feedback component 232, power management component 234, and/or OTA disabling component 404. Moreover, although not shown, it is contemplated that the one or more components of UE 1002 can be part of processor 1012 or a plurality of processors (not shown).

Figure 11:
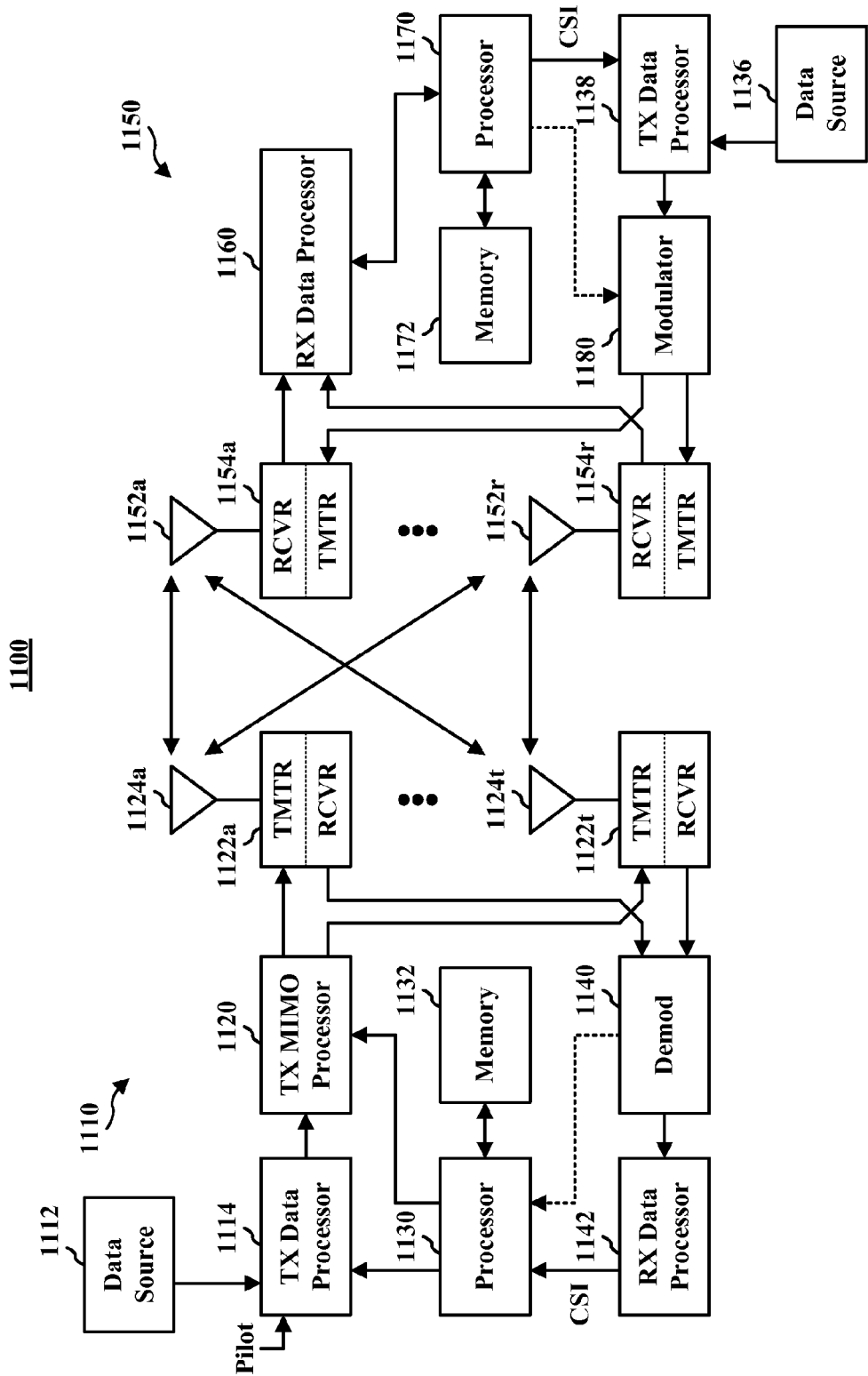
FIG. 11 is an illustration of an example wireless communication system that can be employed in conjunction with the various systems and methods described herein.

FIG. 11 shows an example wireless communication system 1100. Wireless communication system 1100 depicts one base station 1110 and one UE 1150 for sake of brevity. However, it is to be appreciated that system 1100 can include more than one base station and/or more than one UE, wherein additional base stations and/or UEs can be substantially similar or different from example base station 1110 and UE 1150 described below. In addition, it is to be appreciated that base station 1110 and/or UE 1150 can employ the systems (FIGS. 1-4 and 7-10) and/or methods (FIGS. 5-6) described herein to facilitate wireless communication therebetween.

At base station 1110, traffic data for a number of data streams is provided from a data source 1112 to a transmit (TX) data processor 1114. According to an example, each data stream can be transmitted over a respective antenna. TX data processor 1114 formats, codes, and interleaves the traffic data stream based on a particular coding scheme selected for that data stream to provide coded data.

The coded data for each data stream can be multiplexed with pilot data using Orthogonal Frequency Division Multiplexing (OFDM) techniques. Additionally or alternatively, the pilot symbols can be Frequency Division Multiplexed (FDM), Time Division Multiplexed (TDM), or Code Division Multiplexed (CDM). The pilot data is typically a known data pattern that is processed in a known manner and can be used at UE 1150 to estimate channel response. The multiplexed pilot and coded data for each data stream can be modulated (e.g., symbol mapped) based on a particular modulation scheme (e.g., binary phase-shift keying (BPSK), quadrature phase-shift keying (QPSK), M-phase-shift keying (M-PSK), M-quadrature amplitude modulation (M-QAM), etc.) selected for that data stream to provide modulation symbols. The data rate, coding, and modulation for each data stream can be determined by instructions performed or provided by processor 1130.

The modulation symbols for the data streams can be provided to a TX MIMO processor 1120, which can further process the modulation symbols (e.g., for OFDM). TX MIMO processor 1120 then provides $N_T$ modulation symbol streams to $N_T$ transmitters (TMTR) 1122a through 1122t. In various embodiments, TX MIMO processor 1120 applies beamforming weights to the symbols of the data streams and to the antenna from which the symbol is being transmitted.

Each transmitter 1122 receives and processes a respective symbol stream to provide one or more analog signals, and further conditions (e.g., amplifies, filters, and upconverts) the analog signals to provide a modulated signal suitable for transmission over the MIMO channel. Further, $N_T$ modulated signals from transmitters 1122a through 1122t are transmitted from $N_T$ antennas 1124a through 1124t, respectively.

At UE 1150, the transmitted modulated signals are received by $N_R$ antennas 1152a through 1152r and the received signal from each antenna 1152 is provided to a respective receiver (RCVR) 1154a through 1154r. Each receiver 1154 conditions (e.g., filters, amplifies, and downconverts) a respective signal, digitizes the conditioned signal to provide samples, and further processes the samples to provide a corresponding "received" symbol stream.

An RX data processor 1160 can receive and process the $N_R$ received symbol streams from $N_R$ receivers 1154 based on a particular receiver processing technique to provide $N_T$ "detected" symbol streams. RX data processor 1160 can demodulate, deinterleave, and decode each detected symbol stream to recover the traffic data for the data stream. The processing by RX data processor 1160 is complementary to that performed by TX MIMO processor 1120 and TX data processor 1114 at base station 1110.

A processor 1170 can periodically determine which available technology to utilize as discussed above. Further, processor 1170 can formulate a reverse link message comprising a matrix index portion and a rank value portion.

The reverse link message can comprise various types of information regarding the communication link and/or the received data stream. The reverse link message can be processed by a TX data processor 1138, which also receives traffic data for a number of data streams from a data source 1136, modulated by a modulator 1180, conditioned by transmitters 1154a through 1154r, and transmitted back to base station 1110.

At base station 1110, the modulated signals from UE 1150 are received by antennas 1124, conditioned by receivers 1122, demodulated by a demodulator 1140, and processed by a RX data processor 1142 to extract the reverse link message transmitted by UE 1150. Further, processor 1130 can process the extracted message to determine which precoding matrix to use for determining the beamforming weights.

Processors 1130 and 1170 can direct (e.g., control, coordinate, manage, etc.) operation at base station 1110 and UE 1150, respectively. Respective processors 1130 and 1170 can be associated with memory 1132 and 1172 that store program codes and data. Processors 1130 and 1170 can also perform computations to derive frequency and impulse response estimates for the uplink and downlink, respectively.

It is to be understood that the aspects described herein can be implemented in hardware, software, firmware, middleware, microcode, or any combination thereof. For a hardware implementation, the processing units can be implemented within one or more application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, other electronic units designed to perform the functions described herein, or a combination thereof.

When the embodiments are implemented in software, firmware, middleware or microcode, program code or code segments, they can be stored in a machine-readable medium, such as a storage component. A code segment can represent a procedure, a function, a subprogram, a program, a routine, a subroutine, a module, a software package, a class, or any combination of instructions, data structures, or program statements. A code segment can be coupled to another code segment or a hardware circuit by passing and/or receiving information, data, arguments, parameters, or memory contents. Information, arguments, parameters, data, etc., can be passed, forwarded, or transmitted using any suitable means including memory sharing, message passing, token passing, network transmission, etc.

For a software implementation, the techniques described herein can be implemented with modules (e.g., procedures, functions, and so on) that perform the functions described herein. The software codes can be stored in memory units and executed by processors. The memory unit can be implemented within the processor or external to the processor, in which case it can be communicatively coupled to the processor via various means as is known in the art.

What has been described above includes examples of one or more embodiments. It is, of course, not possible to describe every conceivable combination of components or methodologies for purposes of describing the aforementioned aspects, but one of ordinary skill in the art can recognize that many further combinations and permutations of various aspects are possible. Accordingly, the described aspects are intended to embrace all such alterations, modifications and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim.

What is claimed is:

1. A method that facilitates responding to overload indicators in a wireless communication environment, comprising:
   receiving an over-the-air overload indicator from a non-serving base station at a user equipment (UE);
   generating a report based upon the over-the-air overload indicator; and
   sending the report to a serving base station from the UE, wherein the UE is configured by the serving base station to ignore the overload indicator sent by the non-serving base station.

2. The method of claim 1, wherein the report includes information related to at least one of the over-the-air overload indicator, a transmit power spectral density (PSD) of the UE after being adjusted based upon the over-the-air overload indicator, or a power headroom of the UE.

3. The method of claim 1, further comprising adjusting a transmit power spectral density (PSD) of the UE based upon the over-the-air overload indicator received from the non-serving base station.

4. The method of claim 3, further comprising:
receiving a power control command from the serving base station at the UE, wherein the power control command is a function of a backhaul overload indicator received by the serving base station from the non-serving base station and the report sent by the UE; and
adjusting the transmit PSD of the UE based upon the power control command.

5. The method of claim 1, further comprising:
receiving a power control command from the serving base station at the UE, wherein the power control command is a function of a backhaul overload indicator received by the serving base station from the non-serving base station; and
adjusting a transmit power spectral density (PSD) of the UE based upon the power control command without alteration based upon the over-the-air overload indicator sent from the non-serving base station.

6. A wireless communications apparatus, comprising:
a memory that retains instructions related to receiving an over-the-air overload indicator from a non-serving base station, generating a report based upon the over-the-air overload indicator, and sending the report to a serving base station, wherein the apparatus is configured by the serving base station to ignore the overload indicator sent by the non-serving base station; and
a processor, coupled to the memory, the processor configured to execute the instructions retained in the memory.

7. The wireless communications apparatus of claim 6, wherein the report includes information related to at least one of the over-the-air overload indicator, a transmit power spectral density (PSD) of the apparatus after being adjusted based upon the over-the-air overload indicator, or a power headroom of the apparatus.

8. The wireless communications apparatus of claim 6, wherein the memory further retains instructions related to adjusting a transmit power spectral density (PSD) of the apparatus based upon the over-the-air overload indicator received from the non-serving base station.

9. The wireless communications apparatus of claim 8, wherein the memory further retains instructions related to receiving a power control command from the serving base station, wherein the power control command is a function of a backhaul overload indicator received by the serving base station from the non-serving base station and the report sent by the apparatus, and to adjust the transmit PSD of the apparatus based upon the power control command.

10. The wireless communications apparatus of claim 6, wherein the memory further retains instructions related to receiving a power control command from the serving base station, wherein the power control command is a function of a backhaul overload indicator received by the serving base station from the non-serving base station, and to adjust a transmit power spectral density (PSD) of the apparatus based upon the power control command without altering the PSD based upon the over-the-air overload indicator sent from the non-serving base station.

11. A wireless communications apparatus that enables utilizing overload indicators in a wireless communication environment, comprising:
means for receiving an over-the-air overload indicator from a non-serving base station;
means for generating a report based upon the over-the-air overload indicator; and
means for sending the report to a serving base station, wherein the apparatus is configured by the serving base station to ignore the overload indicator sent by the non-serving base station.

12. The wireless communications apparatus of claim 11, further comprising means for adjusting a transmit power spectral density (PSD) of the apparatus based upon the over-the-air overload indicator received from the non-serving base station.

13. The wireless communications apparatus of claim 11, further comprising means for adjusting a transmit power spectral density (PSD) of the apparatus based upon a power control command received from the serving base station, wherein the power control command is a function of the report and a backhaul overload indicator received by the serving base station from the non-serving base station.

14. The wireless communications apparatus of claim 11, wherein the report includes information related to at least one of the over-the-air overload indicator, a transmit power spectral density (PSD) of the apparatus after being adjusted based upon the over-the-air overload indicator, or a power headroom of the apparatus.

15. The apparatus of claim 11, further comprising:
means for receiving a power control command from the serving base station, wherein the power control command is a function of a backhaul overload indicator received by the serving base station from the non-serving base station; and
means for adjusting a transmit power spectral density (PSD) of the apparatus based upon the power control command without alteration based upon the over-the-air overload indicator sent from the non-serving base station.

16. A computer program product, comprising:
a non-transitory computer-readable medium comprising:
code for receiving an over-the-air overload indicator from a non-serving base station at a user equipment (UE);
code for generating a report based upon the over-the-air overload indicator; and
code for sending the report to a serving base station from the UE, wherein the UE is configured by the serving base station to ignore the overload indicator sent by the non-serving base station.

17. The computer program product of claim 16, wherein the computer-readable medium further comprises code for adjusting a transmit power spectral density (PSD) of the UE based upon the over-the-air overload indicator received from the non-serving base station.

18. The computer program product of claim 16, wherein the computer-readable medium further comprises code for adjusting a transmit power spectral density (PSD) of the UE based upon a power control command received from the serving base station, wherein the power control command is a function of the report and a backhaul overload indicator received by the serving base station from the non-serving base station.

19. The computer program product of claim 16, wherein the report includes information related to at least one of the over-the-air overload indicator, a transmit power spectral density (PSD) of the UE after being adjusted based upon the over-the-air overload indicator, or a power headroom of the UE.

20. The computer program product of claim 16, further comprising:
code for receiving a power control command from the serving base station at the UE, wherein the power control command is a function of a backhaul overload indicator received by the serving base station from the non-serving base station; and code for adjusting a transmit power spectral density (PSD) of the UE based upon the power control command without alteration based upon the over-the-air overload indicator sent from the non-serving base station.

21. A wireless communications apparatus, comprising:

a processor configured to:
- receive an over-the-air overload indicator from a non-serving base station;
- generate a report based upon the over-the-air overload indicator; and
- send the report to a serving base station, wherein the apparatus is configured by the serving base station to ignore the overload indicator sent by the non-serving base station.

22. The apparatus of claim 21, wherein the processor is further configured to:
- receive a power control command from the serving base station at the apparatus, wherein the power control command is a function of a backhaul overload indicator received by the serving base station from the non-serving base station; and
- adjust a transmit power spectral density (PSD) of the apparatus based upon the power control command without alteration based upon the over-the-air overload indicator sent from the non-serving base station.

* * * * *